(12) United States Patent
Huang et al.

(10) Patent No.: US 11,870,342 B2
(45) Date of Patent: *Jan. 9, 2024

(54) RESONANT CONVERTER AND OPERATING METHOD THEREOF

(71) Applicant: Delta Electronics (Shanghai) Co., Ltd., Shanghai (CN)

(72) Inventors: Hui Huang, Shanghai (CN); Kun-Peng Wang, Shanghai (CN); Shuai-Lin Du, Shanghai (CN); Wei-Ke Yao, Shanghai (CN); Feng Yao, Shanghai (CN); Kai Dong, Shanghai (CN); Jin-Fa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 58 days.

This patent is subject to a terminal disclaimer.

(21) Appl. No.: 17/456,888

(22) Filed: Nov. 30, 2021

(65) Prior Publication Data
US 2023/0076528 A1    Mar. 9, 2023

(30) Foreign Application Priority Data
Sep. 8, 2021   (CN) .......................... 202111048497.0

(51) Int. Cl.
*H02M 3/00*  (2006.01)
*H02M 1/00*  (2006.01)
*H02M 3/335* (2006.01)

(52) U.S. Cl.
CPC ........... *H02M 3/01* (2021.05); *H02M 1/0096* (2021.05); *H02M 1/0058* (2021.05); *H02M 3/33576* (2013.01)

(58) Field of Classification Search
CPC ............ H02M 1/0058; H02M 1/0096; H02M 3/01–015; H02M 3/33569–33592
See application file for complete search history.

(56) References Cited

U.S. PATENT DOCUMENTS

| | | |
|---|---|---|
| 6,504,497 B2 | 1/2003 | Jang et al. |
| 7,061,212 B2 | 6/2006 | Phadke |
| 7,729,143 B2 | 6/2010 | Lin et al. |
| 8,736,240 B2 | 5/2014 | Liu et al. |
| 9,490,704 B2 | 11/2016 | Jang et al. |
| 9,812,977 B2 | 11/2017 | Ye et al. |
| 11,588,398 B1 * | 2/2023 | Huang ................ H02M 3/3385 |
| 11,705,815 B1 * | 7/2023 | Shi .......................... H02M 3/01 363/17 |
| 2012/0014138 A1 * | 1/2012 | Ngo .................. H02M 3/33584 363/17 |

(Continued)

*Primary Examiner* — Fred E Finch, III
(74) *Attorney, Agent, or Firm* — CKC & Partners Co., LLC

(57) ABSTRACT

A resonant converter includes primary and secondary circuits, a transformer, a resonant network and a control circuit. The control circuit is coupled to the primary circuit and the secondary circuit, and configured to control primary switches of the primary circuit operating with a switching frequency. At least one of primary switches is configured to be turned on from a first switching moment until a second switching moment. The control circuit is configured to control secondary switches of the secondary circuit, such that at least one of secondary switches is turned on during a first time interval to increase a current of the resonant network in a first flowing direction and an output current in a second flowing direction or equal to zero.

31 Claims, 9 Drawing Sheets

(56) References Cited

U.S. PATENT DOCUMENTS

| | | | | |
|---|---|---|---|---|
| 2019/0393769 A1* | 12/2019 | Wei | ................... | H02M 3/33592 |
| 2020/0186046 A1* | 6/2020 | Tanaka | ................... | H02M 1/32 |
| 2020/0287471 A1* | 9/2020 | Huang | ............... | H02M 3/33561 |
| 2020/0287472 A1* | 9/2020 | Ye | .......................... | H02M 3/01 |
| 2021/0367521 A1* | 11/2021 | Sakai | ................ | H02M 3/33573 |
| 2022/0103082 A1* | 3/2022 | Yang | ................ | H02M 3/33592 |

\* cited by examiner

RESONANT CONVERTER AND OPERATING METHOD THEREOF

CROSS-REFERENCE TO RELATED APPLICATION

This application claims priority to China Application Serial Number 202111048497.0, filed Sep. 8, 2021, which is herein incorporated by reference in its entirety.

BACKGROUND

Technical Field

The present disclosure relates to a converter. More particularly, the present disclosure relates to a resonant converter and an operating method thereof.

Description of Related Art

High efficiency and high power density is the trend of power supply.

Typical AC-DC server power supply usually has two stages, which are a front end stage and a post DC-DC stage. The LLC converter can achieve zero voltage switching of primary switches and zero current switching of secondary switch, which is widely used as the post DC-DC stage. In a real application, the output voltage of LLC converter needs to be held in a specified voltage range for a period of time (e.g. holdup time), such as 10 ms or 20 ms, when the input source of the server power supply fails.

In the period of time the input source fails, the LLC converter will discharge the output bulk capacitor of the front end stage. The capacitance of the output bulk capacitor, voltage across the output bulk capacitor and voltage gain of the LLC converter determine the discharge energy of the output bulk capacitor. To achieve high efficiency of the LLC converter, the voltage gain of the LLC converter is very narrow from design. So high efficient LLC converter with a long holdup time is very challenging.

At present, more and more research is done to increase holdup time of the power supply. One solution is to increase capacity of the output bulk capacitor for longer holdup time, but it increases the cost and requires more space within the power supply. Another technical solution is to add an additional boost circuit between the front end stage and the LLC converter, which can increase voltage gain from output of the front end stage to output of the post dc-dc stage through the wide voltage gain of boost circuit. But this solution also increases the cost and design complexity of the power supply.

Above-mentioned technical solutions have disadvantages such as higher cost and lower power density.

SUMMARY

The present disclosure includes a resonant converter including a primary circuit, a transformer, a resonant network, a secondary circuit and control circuit. The primary circuit is coupled to an input power supply and comprising a plurality of primary switches. The transformer has a primary winding and a secondary winding. The resonant network coupled between the primary circuit and the primary winding. The secondary circuit is coupled to the secondary winding, and including a plurality of secondary switches. The control circuit is coupled to the primary circuit and the secondary circuit, and configured to control the plurality of primary switches operating with a switching frequency. At least one of primary switches is configured to be turned on from a first switching moment until a second switching moment; and the control circuit is configured to control at least one of the plurality of secondary switches to be turned on during a first time interval, such that the secondary winding being clamped by a preset voltage, a current of the resonant network is increased in a first flowing direction, and an output current is increased in a second flowing direction or equal to zero. The first time interval is between the first switching moment and the second switching moment.

The present disclosure includes a method of operating a resonant converter. The resonant converter includes a primary circuit, a resonant network coupled to the primary circuit, a transformer having a primary winding coupled to the resonant network and a secondary winding, a secondary circuit coupled to the secondary winding and a control circuit coupled to the primary circuit and the secondary circuit. The primary circuit includes a plurality of primary switches, and the secondary circuit includes a plurality of secondary switches. The method includes following operations: controlling the plurality of primary switches operating with a switching frequency, in which at least one of the primary switches is configured to be turned on from a first switching moment until a second switching moment; controlling at least one of the secondary switches to be turned on during a first time interval, such that the secondary winding being clamped by a preset voltage, a current of the resonant network is increased in a first flowing direction, and an output current is increased in a second flowing direction or equal to zero, in which the first time interval is between the first switching moment and the second switching moment.

The present disclosure includes a resonant converter including a primary circuit, a transformer, a resonant network, a secondary circuit and control circuit. The primary circuit is coupled to an input power supply and comprising a plurality of primary switches. The transformer has a primary winding and a secondary winding. The resonant network coupled between the primary circuit and the primary winding. The secondary circuit is coupled to the secondary winding, and including a plurality of secondary switches. The control circuit is coupled to the primary circuit and the secondary circuit, and configured to control the plurality of primary switches operating with a switching frequency. At least one of primary switches is configured to be turned on from a first switching moment until a second switching moment. When the switching frequency is greater than a preset switching frequency, the control circuit is configured to control the plurality of secondary switches operating in a normal state. When the switching frequency is lesser than or equal to the preset switching frequency, the control circuit is configured to control at least one of the plurality of secondary switches to be turned on during a first time interval, such that the secondary winding being clamped by a preset voltage, a current of the resonant network is increased in a first flowing direction, and an output current is increased in a second flowing direction or equal to zero. The first time interval is between the first switching moment and the second switching moment.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
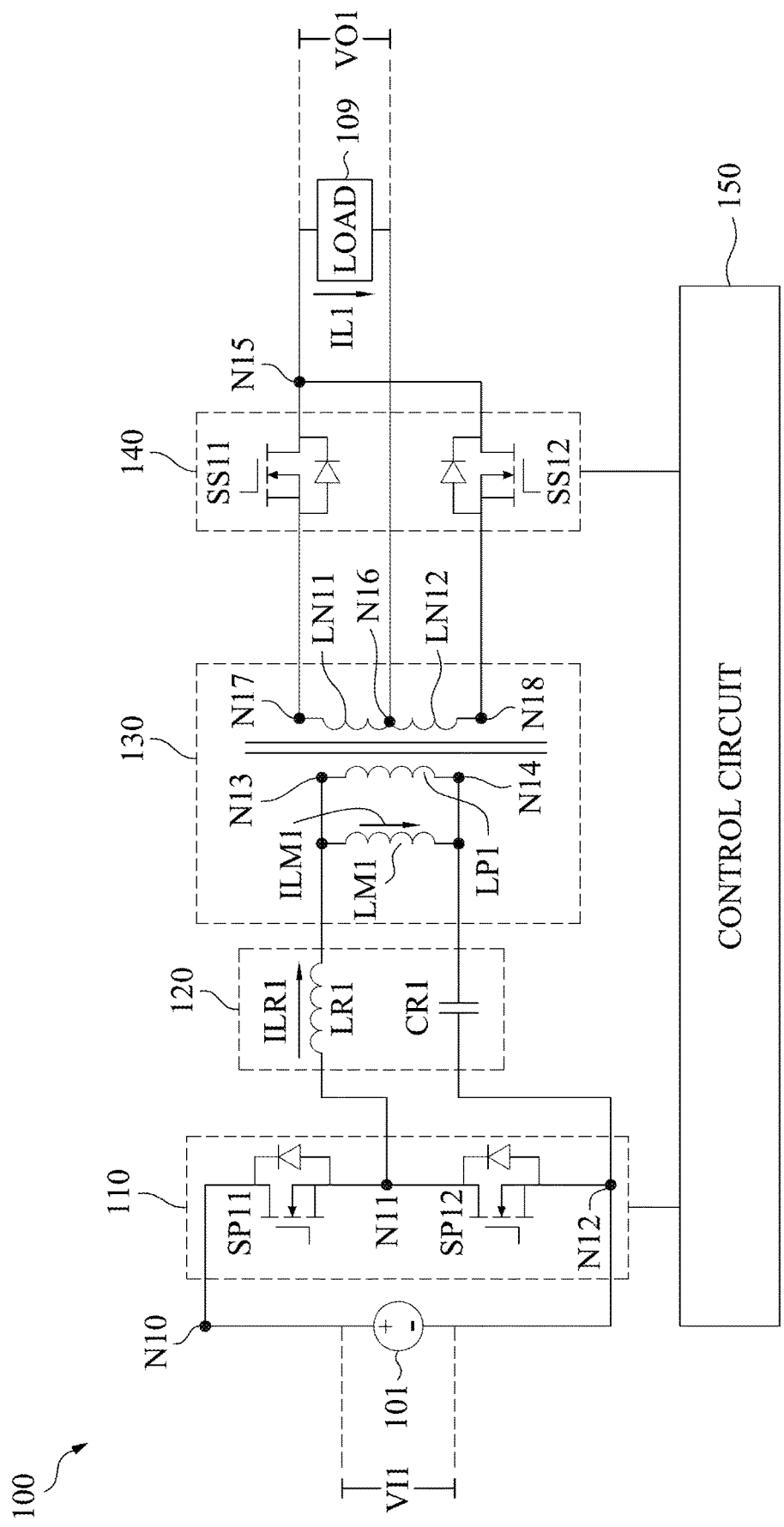
FIG. 1 is a circuit diagram of a resonant converter in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a circuit diagram of a resonant converter 100 in accordance with some embodiments of the present disclosure. As illustratively shown in FIG. 1, the resonant converter 100 is configured to receive an input voltage VI1 from an input power supply 101 and provide an output voltage VO1 to a load 109. The resonant converter 100 includes a primary circuit 110, a resonant network 120, a transformer 130, a secondary circuit 140 and a control circuit 150.

In some embodiments, the primary circuit 110 is coupled to an input power supply 101 to receive an input voltage VI1. The transformer 130 has a primary winding and secondary winding. The resonant network 120 is coupled between the primary circuit 110 and the primary winding, wherein the resonant network 120 can be implemented as an LLC (inductance-inductance-capacitor) resonant network, an LC resonant network or an LCC resonant network. The secondary circuit 140 is coupled between the secondary winding and a load 109. In some embodiments, the primary circuit 110 is configured to receive the electric energy from the input power supply 101 and transmit the electric energy to the resonant network 120. In some embodiments, the input power supply 101 is a bulk capacitor or an independent DC power supply or a battery or a DC output voltage of other circuits. The resonant network 120 is configured to store the electric energy and transmit the electric energy to the transformer 130. The transformer 130 is configured to transmit the electric energy to the secondary circuit 140 and the secondary circuit 140 is configured to receive the electric energy and provide the electric energy to a load 109. The transformer 130 may be configured to transmit the electric energy from the secondary circuit 140 to the resonant network 120 and/or the input power supply 101. The control circuit 150 is configured to control the primary circuit 110 and the secondary circuit 140.

In some embodiments, the control circuit 150 is coupled to the primary circuit 110 and the secondary circuit 140, and configured to control primary switches SP11 and SP12 of the primary circuit 110 operating with a switching frequency FS, such as the switching frequency FS described below and shown in FIGS. 5A-5D. In some embodiments, at least one of primary switches SP11 and SP12 is configured to be turned on from a first switching moment (e.g. moments T20 and T40 described below and shown in FIGS. 2 and 4) until a second switching moment (e.g. moments T24 and T44 shown in FIGS. 2 and 4). In some embodiments, the control circuit 150 is configured to control secondary switches SS11-SS12 of the secondary circuit 140, such that at least one of secondary switches SS11-SS12 is turned on during a first time interval between the first switching moment (e.g. moments T20 and T40 described below and shown in FIGS. 2 and 4) and the second switching moment (e.g. moments T24 and T44 described below and shown in FIGS. 2 and 4), the secondary winding being clamped by a preset voltage, a current ILR1 of the resonant network 120 is increased in a first flowing direction in which the current ILR1 flows from the primary circuit 110 to resonant network 120, and an output current IL1 is increased in a second flowing direction in which the output current IL1 flows from the secondary circuit 140 to the transformer 130 or the output current IL1 is equal to zero. The preset voltage may be an inverse voltage, and a polarity of the inverse voltage is opposite to a polarity of an induced voltage of the secondary winding. The preset voltage may be equal to zero, when secondary winding is short-circuited. When the preset voltage is the inverse voltage, the energy from the input power supply 101 and the secondary circuit 140 is stored in the resonant network 120. When the preset voltage is equal to zero, the energy from the input power supply 101 is stored in the resonant network 120. When at least one of secondary switches SS11-SS12 is turned on during the first time interval, the secondary winding is clamped by a preset voltage to increase the gain of the resonant converter 100 and increase the holdup time of the resonant converter 100. In the holdup time, output voltage VO1 of the resonant converter 100 is maintained in a specified voltage range.

In some embodiments, the control circuit 150 is configured to adjust the first time interval according to an output voltage VO1, or adjust the first time interval according to a signal of the output voltage VO1 and the input voltage VI1. In some embodiments, the input voltage VI1 can be replaced by an input current or an input power, and the output voltage VO1 can be replaced by an output current or an output power.

In some embodiments, a gain of the resonant converter 100 is increased when the first time interval is increased.

In some embodiments, when the switching frequency FS is greater than a preset switching frequency, the control circuit 150 is configured to control the secondary switches SS11-SS12 operating in a normal state. In some embodiments, when the switching frequency FS is lesser than or equal to the preset switching frequency, the control circuit 150 is configured to control at least one of the secondary switches SS11-SS12 to be turned on during the first time interval, such that the secondary winding being clamped by a preset voltage, a current ILR1 of the resonant network 120 is increased in a first flowing direction, and an output current IL1 is increased in a second flowing direction or equal to zero, wherein the first time interval is between the first switching moment and the second switching moment. In some embodiments, when the switching frequency FS is greater than the preset switching frequency, a control loop (for example, one of the control loops 552A-552D shown in FIGS. 5A-5D) stops providing a phase-shifting angle (for example, the phase-shifting angle PSS shown in FIGS. 5A-5D), such that the secondary switches operate in the normal state.

As illustratively shown in FIG. 1, the primary circuit 110 is implemented by a half bridge circuit including switches SP11 and SP12. The switches SP11, SP12 are coupled in series. The switch SP11 is coupled to the input power supply 101 at a node N10. The switch SP12 is coupled to the input power supply 101 at a node N12. In some embodiments, the switches SP11 and SP12 are configured to operate with a switching frequency FS determined by the control circuit 150. In some other embodiments, the primary circuit 110 is implemented by a full bridge circuit as a primary circuit 310 illustratively shown in FIG. 3.

As illustratively shown in FIG. 1, the resonant network 120 is implemented by an LLC resonant network including an inductor LR1, an excited inductance LM1 and a capacitor CR1. The excited inductance LM1 is coupled to the primary winding LP1 in parallel. The excited inductance LM1 is an inductor independent from the primary winding LP1, or the excited inductance LM1 is a stray inductance of the primary winding LP1. An excited current ILM1 flows through the excited inductance LM1. A first terminal of the inductor LR1 is coupled to the switches SP11, SP12 at a node N11, a second terminal of the inductor LR1 is coupled to the primary winding LP1 at the node N13. A first terminal of the capacitor CR1 is coupled to the primary winding LP1 at the node N14, a second terminal of the capacitor CR1 is coupled to the switch SP12 at the node N12. In operation, a current ILR1 passes through the inductor LR1 when the resonant converter 100 operates.

As illustratively shown in FIG. 1, the transformer 130 is a center-tapped transformer including the primary winding LP1 and the secondary winding, wherein the secondary winding includes two coils LN11 and LN12. The secondary winding of the center-tapped transformer includes a first terminal N17, a center-tapped terminal N16 and a second terminal N18. The coils LN11 and LN12 are connected in series at the center-tapped terminal N16 and coupled to the secondary circuit 140. An output voltage is an input voltage times a turns ratio of the secondary winding and the primary winding.

As illustratively shown in FIG. 1, the secondary circuit 140 is implemented by a half bridge circuit including switches SS11 and SS12. A first terminal of the switch SS11 is coupled to the first terminal N17 of the secondary winding, and a second terminal switch SS11 is coupled to a first output terminal N15 of the resonant converter 100. A first terminal of the switch SS12 is coupled to the second terminal N18 of the secondary winding, and a second terminal of the switch SS12 is coupled to the second terminal of the switch SS11. The center-tapped terminal N16 is coupled to a second output terminal of the resonant converter 100. The load 109 is coupled to the first output terminal N15 and the second output terminal of the resonant converter 100. In some embodiments, the operation of the switches SS11 and SS12 are determined by the control circuit 150. In some embodiments, the switches SS11, SS12 of the secondary circuit 140 and the switches SP11, SP12 of the primary circuit 110 operate with same switching frequencies. In some other embodiments, the switches SS11, SS12 of the secondary circuit 140 and the switches SP11, SP12 of the primary circuit 110 operate with different switching frequencies, for example, the switching frequency of the switches SS11 and SS12 is positive integer times of the switching frequency of the switches SP11, SP12. In some other embodiments, the secondary circuit 140 is implemented by a full bridge circuit as a secondary circuit 340 illustratively shown in FIG. 3.

As illustratively shown in FIG. 1, the control circuit 150 is configured to control the switches SP11, SP12 of the primary circuit 110 and the switches SS11, SS12 of the secondary circuit 140. In some embodiments, the control circuit 150 is configured to determine the switching frequency, a turn-on time and a turn-off time of the switches SS11, SS12 and the switches SP11, SP12 according to the output voltage VO1, wherein the output voltage VO1 can be replaced by an output current or an output power. In some embodiments, the control circuit 150 is configured to determine the switching frequency, a turn-on time and a turn-off time of the switches SS11, SS12 and the switches SP11, SP12 according to the output voltage VO1 and an input voltage VI1, wherein the input voltage VI3 can be replaced by an input current or an input power, the output voltage VO1 can be replaced by an output current or an output power. In some embodiments, there is a dead time between a turn-off time and a turn-on time of the switches.

For example, the control circuit 150 decreases the switching frequency to increase a gain of the resonant converter 100 when the output voltage VO1 is lower than a target voltage. Therefore, the control circuit 150 is configured to adjust the switching frequency until the output voltage VO1 is substantially equal to the target voltage.

Figure 2:
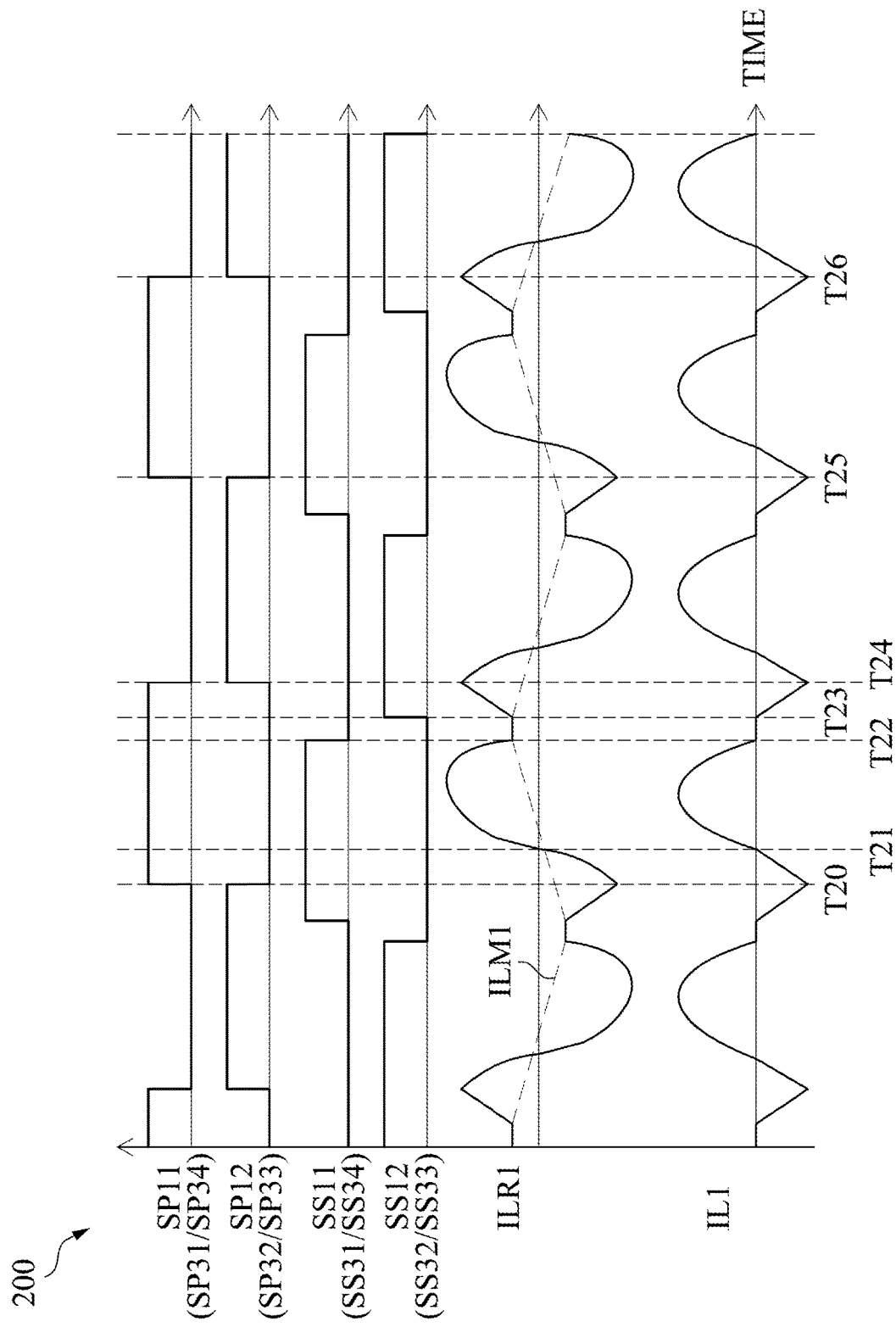
FIG. 2 is a control time sequence diagram of the resonant converter in accordance with some embodiments of the present disclosure.

FIG. 2 is a time sequence diagram of an operation of the resonant converter 100 in accordance with some embodiments of the present disclosure. As illustratively shown in FIG. 2, a time sequence diagram 200 illustrates operations of the resonant converter 100 at moments T20-T26.

As illustratively shown in FIG. 2 with reference to FIG. 1, the time sequence diagram 200 illustrates operations of the switches SS11, SS12 and the switches SP11, SP12 at different moments. Furthermore, the time sequence diagram 200 also illustrates current waveforms of the currents IL1, ILR1 and ILM1 with respect to time.

Since the operation of the resonant converter 100 is repeated periodically with the switching frequency, descriptions below focus on operations in a time interval [T20-T24] from the first switching time until the second switching time. In other intervals other than the time interval [T20-T24], operations of the resonant converter 100 are similar to those in the time interval [T20-T24]. For example, in a time interval [T25-T26], the switches SS11, SS12 and the switches SP11, SP12 operates in a same way as the time interval [T20-T24]. In a time interval [T24-T25], the switches SS11, SS12 and the switches SP11, SP12 operates in a complementary fashion of the time interval [T20-T24], in which the turned on switches and the turned off switches in the time interval [T20-T24] and the time interval [T24-T25] are in the complementary fashion. In some embodiments, there is a dead time between a time interval [T20-T24] and a time interval [T24-T25]; there is a dead time between a time interval [T24-T25] and a time interval [T25-T26].

As illustratively shown in FIG. 2, during the time interval [T20-T24], the switch SP11 is configured to be turned on and the switch SP12 is configured to be turned off, in which the time interval [T20-T24] is from the first switching moment T20 until the second switching moment T24.

During the time interval [T20-T21], the current ILR1 flows in a direction from the node N13 passing through the inductor LR1 to the node N11.

As illustratively shown in FIG. 2, during the time interval [T20-T21], the switch SS11 is configured to be turned on and the switch SS12 is configured to be turned off, such that the output current IL1 flows in a direction (a second flowing direction) from the switch SS11 passing through the coil LN11 to the node N16. The electric energy from the secondary circuit 140 is transmitted to the capacitor CR1 and the input power supply 101 via the transformer 130.

As illustratively shown in FIG. 2, during the time interval [T20-T21], the current ILR1 increases from a negative value to zero. At the moment T21, the current ILR1 is equal to zero. After the moment T21, the current ILR1 changes a flowing direction, for example, current ILR1 flows in a direction (a first flowing direction) from the node N11 passing through the inductor LR1 and the capacitor CR1 to the node N12.

As illustratively shown in FIG. 2, during the time interval [T21-T22], the switch SS11 is configured to be turned on and the switch SS12 is configured to be turned off, such that the output current IL1 flows in a direction from the node N16 passing through the coil LN11 to the switch SS11. The electric energy from the resonant network 120 and the input power supply 101 is transmitted to the secondary circuit 140.

As described above, control circuit 150 is configured to adjust the gain of the resonant converter 100.

As illustratively shown in FIG. 2, during the time interval [T22-T23], the current ILR1 flows in a direction (a first flowing direction) from the node N11 passing through the inductor LR1 to the node N13. During the time interval [T22-T23], the primary circuit 110 is in LLC resonant state. The electric energy from the input power supply 101 is transmitted to the resonant network 120, that is, the electric energy is stored in the resonant network 120.

During the time interval [T22-T23], the switches SS11 and SS12 are configured to be turned off. In some embodiments, during the time interval [T22-T23], the output current IL1 is substantially equal to zero.

In some embodiments, the control circuit 150 is configured to adjust the time interval [T22-T23] which is between the first switching moment T20 and the time interval [T23-T24] according to the output voltage VO1. In some embodiments, the control circuit 150 is configured to adjust the time interval [T22-T23] according to the output voltage VO1 and the input voltage VI1.

As described above, control circuit 150 is configured to adjust the gain of the resonant converter 100 to realize the zero current switching (ZCS) of the switches SS11 and SS12.

As illustratively shown in FIG. 2, during the time interval [T23-T24], the current ILR1 flows in a direction (a first flowing direction) from the node N11 passing through the inductor LR1 to the node N13.

During the time interval [T23-T24], the switch SS12 is configured to be turned on and the switch SS11 is configured to be turned off, such that the output current IL1 flows in a direction (a second flowing direction) from the node N15 passing through the switch SS12 and the coil LN12 to the node N16. The electric energy from the secondary circuit 140 and the input power supply 101 is transmitted to the resonant network 120, that is, the energy is stored in the resonant network 120.

In some embodiments, the output current IL1 flows in the coil LN12 from the node N18 to the node N16, and the coil LN12 of the secondary winding is clamped by a preset voltage which is an inverse voltage. The polarity of an induced voltage of the coil LN12 is opposite to a polarity of the inverse voltage.

The energy from the secondary circuit 140 and the input power supply 101 is stored in the resonant network 120, so the current ILR1 of the resonant network 120 is increased in the first flowing direction and the output current IL1 is increase in the second flowing direction, such that the holdup time of the resonant converter 100 is increased to maintain the output voltage in the specific voltage range. In some embodiments, value of the target voltage is same as that of the output voltage VO1 of the resonant converter 100. A voltage difference between two terminals (that is, the nodes N13 and N14) of the primary winding LP1 induced by the induced voltage of the coil LN12 is equal to induced voltage times a turns ratio between the primary winding LP1 and the coil LN12.

As described above, due to the electric energy from the input power supply 101 and the secondary circuit 140 being transmitted to the resonant network 120, the current ILR1 is increased in the first flowing direction and the output current IL1 is increased in the second flowing direction during the time interval [T23-T24], such that the holdup time of the resonant converter 100 is increased. The disclosure is not required for adding extra components and extra cost comparing to some conventional approaches.

In some embodiments, the control circuit 150 is configured to control the switches SS11, SS12 to increase storage energy of the resonant network 120, such that the gain of the resonant converter 100 is increased. In the embodiments corresponding to FIG. 2, the control circuit 150 is configured to adjust the time interval [T23-T24] by turning on the switch SS12 according to the output voltage VO1. For example, the control circuit 150 is configured to turn on the switch SS12 earlier in the time interval [T22-T24], such that the moment T23 is moved forward in time and a length of the time interval [T23-T24] is increased correspondingly to increase the gain of the resonant converter 100. In some embodiments, the control circuit 150 is configured to adjust the time interval [T23-T24] according to the output voltage VO1 and the input voltage VI1.

As described above, the control circuit 150 is configured to adjust the gain of the resonant converter 100 by adjusting the current ILR1. Therefore, by controlling the switches SS11, SS12 during the time interval [T23-T24], the control circuit 150 is configured to increase the gain of the resonant converter 100 to maintain the output voltage in the specific voltage range.

For example, when the input power supply 101 fails, the control circuit 150 starts to control the switches SS11, SS12 as described above to increase the gain of the resonant converter 100, such that holdup time is increased and the output voltage is maintained in the specific voltage range.

In some other embodiments, the operations in the time interval [T20-T25] described above are implemented by a resonant converter 300 described below. When the resonant converter 300 operates according to the operations described above, operations of switches SP31-SP34 and SS31-SS34 of the resonant converter 300 are described as following: the switches SP31 and SP34 operate as the switch SP11, the switches SP32 and SP33 operate as the switch SP12, the switches SS32 and SS33 operate as the switch SS12, and the switches SS31 and SS34 operate as the switch SS11. Further details are described below.

Figure 3:
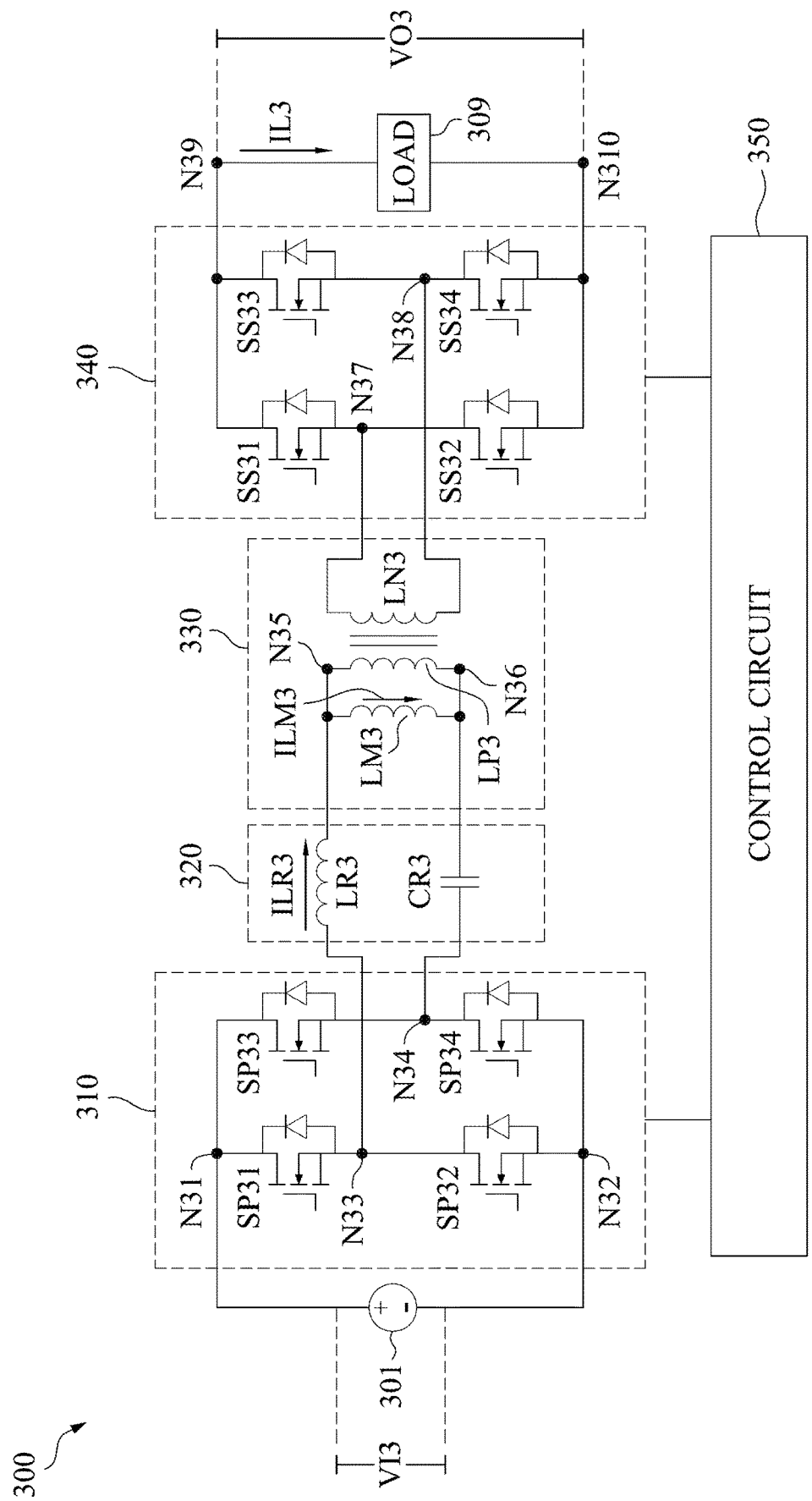
FIG. 3 is a circuit diagram of a resonant converter in accordance with some embodiments of the present disclosure.

FIG. 3 is a circuit diagram of a resonant converter 300 in accordance with some embodiments of the present disclosure. As illustratively shown in FIG. 3, the resonant converter 300 is configured to receive an input voltage VI3 and provide an output voltage VO3 to a load 309, wherein the input voltage VI3 can be replaced by an input current or an input power, the output voltage VO3 can be replaced by an output current or an output power. The resonant converter 300 includes a primary circuit 310, a resonant network 320, a transformer 330, a secondary circuit 340 and a control circuit 350. The configurations and operations of components of resonant converter 300 are similar to those of the resonant converter 100 in FIG. 1. Therefore, some descriptions are not repeated in embodiments associated with FIG. 3 for brevity.

As illustratively shown in FIG. 3, the primary circuit 310 is implemented by a full bridge circuit including switches SP31-SP34. The switches SP31, SP32 are coupled in series. The switches SP31, SP32 are coupled to an input power supply 301 at nodes N31 and N32, respectively. The switches SP33, SP34 are coupled in series. The switches SP33, SP34 are also coupled to the input power supply 301 at the nodes N31 and N32, respectively. In some embodiments, the switches SP31-SP34 are configured to operate with a switching frequency determined by the control circuit 350. In some other embodiments, the primary circuit 310 is implemented by a half bridge circuit as the primary circuit 110 illustratively shown in FIG. 1.

As illustratively shown in FIG. 3, the resonant network 320 includes an inductor LR3 and a capacitor CR3. A first terminal of the inductor LR3 is coupled to the switches SP31, SP32 at a node N33, and a second terminal of the inductor LR3 is coupled to the primary winding LP3 of the transformer 330 at the node N35. A first terminal of the capacitor CR3 is coupled to the switches SP33, SP34 at the node N34, and a second terminal of the capacitor CR3 is coupled to the primary winding LP3 at the node N36. In operation, a current ILR3 passes through the resonant network 320 when the resonant converter 300 operates.

As illustratively shown in FIG. 3, the secondary winding LN3 is coupled to the secondary circuit 340.

As illustratively shown in FIG. 3, the secondary circuit 340 is implemented by a full bridge circuit including switches SS31-SS34. The switches SS31-SS32 are coupled in series and the switches SS33-SS34 are coupled in series. The switches SS31, SS32 are coupled to the secondary winding LN3 at a node N37. The switches SS33, SS34 are coupled to the secondary winding LN3 at a node N38. The switches SS31, SS33 are coupled to a first output terminal of the resonant converter at a node N39. The switches SS32, SS34 are coupled to a second output terminal of the resonant converter at a node N310. The node N39 and the node N310 are coupled to a load 309. In some embodiments, the switches SS31-SS34 are configured to operate with a secondary switching frequency determined by the control circuit 150. Thus, the switches SS31-SS34 and the switches SP31-SP34 may operate with same switching frequencies. In some other embodiments, the switches SS31-SS34 of the secondary circuit 140 and the switches SP31-SP34 of the primary circuit 110 operate with different switching frequencies. In some other embodiments, the secondary circuit 340 is implemented by a half bridge circuit as the secondary circuit 140 illustratively shown in FIG. 1.

As illustratively shown in FIG. 3, the control circuit 350 is configured to control the switches SP31-SP34 of the primary circuit 310 and the switches SS31-SS34 of the secondary circuit 340. In some embodiments, the control circuit 350 is configured to determine the switching frequency, a turn-on time and a turn-off time of the switches SP31-SP34 and the switches SS31-SS34 according to an output voltage VO3. In some embodiments, the control circuit 350 is configured to determine the switching frequency, a turn-on time and a turn-off time of the switches SP31-SP34 and the switches SS31-SS34 according to an output voltage VO3 and an input voltage VI3.

For example, the control circuit 350 decreases the switching frequency to increase a gain of the resonant converter 300. Therefore, the control circuit 350 is configured to adjust the switching frequency to adjust the gain of the resonant converter 300.

In some embodiments, operations of the resonant converter 300 are described by the timing diagram 200.

As illustratively shown in FIG. 3 reference to FIG. 2, during the time interval [T20-T24], the switches SP31 and SP34 are configured to be turned on and the switches SP32 and SP33 are configured to be turned off.

During the time interval [T20-T21], the current ILR3 flows in a direction from the node N35 passing through the inductor LR3 to the node N33.

As illustratively shown in FIG. 2, during the time interval [T20-T21], the switches SS31 and SS34 are configured to be turned on and the switches SS32 and SS33 is configured to be turned off, such that the output current IL3 flows in a direction (the second direction) from the node N37 passing through the secondary winding LN3 to the node N38. The electric energy is transmitted from the secondary circuit 340 to the resonant network 320 and the input power supply 301 via the transformer 330.

As illustratively shown in FIG. 2, during the time interval [T20-T21], the current ILR3 is increased from a negative value to zero. At the moment T21, the current ILR3 is equal to zero. After the moment T21, the current ILR3 changes a flowing direction, such that during the time interval [T21-T22], the current ILR3 flows in a direction (the first direction) from the node N33 passing through the inductor LR3 to the node N35. During the time interval [T21-T22], the electric energy is transmitted from the resonant network 320 and the input power supply 301 to the secondary circuit 340.

As illustratively shown in FIG. 2, during the time interval [T21-T22], the switches SS31 and SS34 are configured to be turned on and the switches SS32 and SS33 are configured to be turned off, such that the current IL3 flows in a direction from the node N38 passing through the secondary winding LN3 to the node N37. The electric energy is transmitted from the resonant network 320 and the input power supply 301 to the secondary circuit 340 via the transformer 330.

As illustratively shown in FIG. 2, during the time interval [T22-T23], the current ILR3 flows in a direction (the first direction) from the node N33 passing through the inductor LR3 to the node N35. During the time interval [T22-T23], the primary circuit 310 is in LLC resonant state. The electric energy is transmitted from the input power supplier 301 to the resonant network 320, that is, the electric energy is stored in the resonant network 320.

During the time interval [T22-T23], the switches SS31-SS34 are configured to be turned off. In some embodiments, the output current IL3 is substantially equal to zero.

As illustratively shown in FIG. 2, during the time interval [T23-T24], the current ILR3 flows in a direction from the node N33 passing through the inductor LR3 to the node N35. The electric energy from the secondary circuit 340 and the input power supply 301 is transmitted to the resonant network 320, that is, the energy is stored in the resonant network 320.

During the time interval [T23-T24], the switches SS32 and SS33 are configured to be turned on and the switches SS31 and SS34 are configured to be turned off, such that the current IL3 flows in a direction from the node N38 passing through the secondary winding LN3 to the node N37. The electric energy is transmitted from the secondary circuit 340 and the input power supply 301 to the resonant network 320.

In some embodiments, the current IL3 flows in the secondary winding LN3 from the node N38 to the node N37, the secondary winding LN12 is clamped by a preset voltage which is an inverse voltage. When the preset voltage is the inverse voltage, a polarity of an induced voltage of the secondary winding LN3 is opposite to a polarity of the inverse voltage, in which a value of the inverse voltage is equal to that of the output voltage of the resonant converter 300. The control circuit 350 is configured to control the switches SS32 and SS33 to be turned on during the time interval [T23-T24], such that the secondary winding LN3 is clamped by the inverse voltage, such that the current ILR3 of the resonant network 320 is increased in the first flowing direction and the output current IL3 is increased in the second flowing direction. The energy from the secondary circuit 340 and the input power supply 301 is stored in the resonant network 320, such that the current ILR3 of the resonant network 320 is increased in the first flowing direction and the current IL3 is increased in the second flowing direction, and the gain of the resonant converter 300 is increased to increase the holdup time and maintain the output voltage VO3 in the specific voltage range. In some embodiments, a value of the inverse voltage is same as that of the output voltage VO3 of the resonant converter 300. A voltage difference between two terminals (that is, the nodes N35 and N36) of the primary winding LP3 induced by the induced voltage of the secondary winding LN3 is equal to induced voltage times a turns ratio between the primary winding LP3 and the secondary winding LN3.

As described above, due to the electric energy being transmitted from the input power supplier 301 and the secondary circuit 340 to the resonant network 320, the current ILR3 is increased in the first flowing direction and the output current IL3 is increased in the second flowing direction during the time interval [T23-T24], such that the gain of the resonant converter 300 is increased.

In some embodiments, the control circuit 350 is configured to control the switches SS31-SS34 to increase the gain of the resonant converter 300 by adjusting the current ILR1 to maintain the output voltage in the specific voltage range. The operations of the control circuit 350 are similar to those of the control circuit 150 as described above. Therefore, some descriptions are not repeated for brevity.

Figure 4:
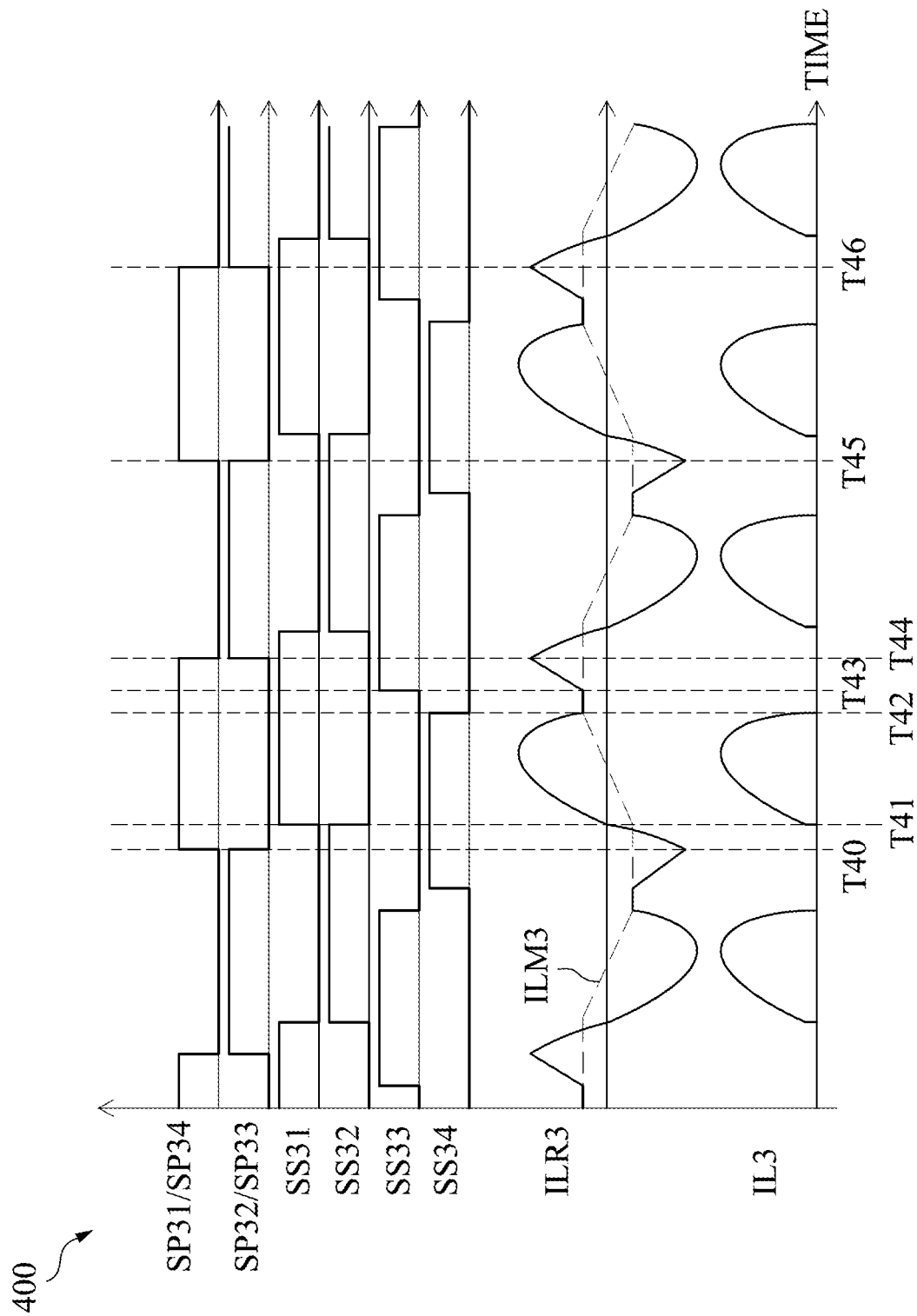
FIG. 4 is a control time sequence diagram of the resonant converter in accordance with some embodiments of the present disclosure.

FIG. 4 is a timing diagram of an operation of the resonant converter 300 in accordance with some embodiments of the present disclosure. As illustratively shown in FIG. 4, a time sequence diagram 400 illustrates operations of the resonant converter 300 at moments T40-T44.

As illustratively shown in FIG. 4 with reference to FIG. 3, the timing diagram 400 illustrates operations of the switches SP31-SP34 and the switches SS31-SS34 at different moments. Furthermore, the timing diagram 400 also illustrates current waveforms of the currents IL3, ILR3 and ILM3 with respect to time.

Since the operation of the resonant converter 300 is repeated periodically with the switching frequency, descriptions below focus on operations in a time interval [T40-T44] between a moment T40 and a moment T44 which has a time length of a half switching period. The resonant converter 300 operates in similar ways in other half switching periods. For example, in a time interval [T45-T46], the switches SP31-SP34 and the switches SS31-SS34 operates as same as the time interval [T40-T44]. In a time interval [T44-T45], the switches SP31-SP34 operates in a complementary fashion of the time interval [T40-T44], in which the turned on switches and the turned off switches in the time interval [T40-T44] and the time interval [T44-T45] are in the complementary fashion.

As illustratively shown in FIG. 4, during the time interval [T40-T44], the switches SP31, SP34 are configured to be turned on and the switches SP32, SP33 are configured to be turned off.

During the time interval [T40-T41], the current ILR3 flows in a direction from the node N35 passing through the inductor LR3 to the node N33. Electric energy from the inductor LR3 is transmitted to the capacitor CR3 and the input power supply 301.

As illustratively shown in FIG. 4, during the time interval [T40-T41], the switches SS32, SS34 are configured to be turned on and the switches SS31, SS33 are configured to be turned off, such that the secondary winding LN3 is short-circuited, that is the secondary winding LN3 is clamped by a preset voltage which is equal to zero. When the secondary winding LN3 is short-circuited, the output current IL3 passing through the load 309 is substantially equal to zero.

As described above, due to the electric energy being transmitted from the inductor LR3 to the capacitor CR3 and the input power supply 301, the current ILR3 increases from a negative value to zero during the time interval [T40-T41].

In some other embodiments, during the time interval [T40-T41], the switches SS32, SS34 are configured to be turned off and the switches SS31, SS33 are configured to be turned on, such that the secondary winding LN3 is short-circuited.

In some other embodiments, during the time interval [T40-T41], the switches SS32, SS33 are configured to be turned off and the switches SS31, SS34 are configured to be turned on, such that the output current IL3 flows in a direction from the node N38 passing through the secondary winding LN3 to the node N37. The secondary winding LN3 is clamped by a preset voltage which is the inverse voltage, in which a polarity of the inverse voltage is opposite to a polarity of the induced voltage of the secondary winding LN3. A value of the preset voltage is same as that of the output voltage of the resonant converter 300. A time interval of the current ILR3 from a negative value to zero is shortened.

In some other embodiments, during the time interval [T40-T41], the switches SS32, SS33 are configured to be turned on and the switches SS31, SS34 are configured to be turned off, such that the output current IL3 flows in a direction from the node N37 passing through the secondary winding LN3 to the node N38.

As illustratively shown in FIG. 4, during the time interval [T40-T41], the current ILR3 increases from a negative value to zero. At the moment T41, the current ILR3 is equal to zero, and after the moment T41 the current ILR1 changes flowing direction from the node N33 passing through the inductor LR3 to the node N35. During the time interval [T41-T42], the electric energy from the resonant network 320 and the input power supply 301 is transmitted to the secondary circuit 340.

During the time interval [T41-T42], the switches SS32, SS33 are configured to be turned off and the switches SS31, SS34 are configured to be turned on, such that the output current IL3 flows in a direction from the node N38 passing through the secondary winding LN3 to the node N37. The electric energy is transmitted from the primary winding LP3 to the secondary winding LN3.

As illustratively shown in FIG. 4, during the time interval [T42-T43], the current ILR3 flows in a direction (a first flowing direction) from the node N33 passing through the inductor LR3 to the node N35. During the time interval [T42-T43], the resonant network 320 is in resonant state. The electric energy from the input power supplier 301 is transmitted to the resonant network 320.

During the time interval [T42-T43], the switches SS32-SS34 are configured to be turned off and the switch SS31 is configured to be turned on. In some embodiments, the current IL3 is substantially equal to zero. During the time interval [T42-T43], the control circuit 350 is configured to adjust the gain of the resonant converter 300 and make the secondary switches to realize ZCS.

In some embodiments, during the time interval [T42-T43], at least three of the switches SS31-SS34 are configured to be turned off, such that the output current IL3 is substantially equal to zero.

As illustratively shown in FIG. 4, during the time interval [T43-T44], the current ILR3 flows in a direction (a first flowing direction) from the node N33 passing through the inductor LR3 to the node N35. The electric energy from the input power supply 301 is transmitted to the resonant network 320.

During the time interval [T43-T44], the switches SS31, SS33 are configured to be turned on, such that the secondary winding LN3 is short-circuited, the current ILR3 of the resonant network 320 is increased in the first flowing direction and the output current IL3 is substantially equal to zero, that is, the secondary winding LN3 is clamped by a preset voltage which is substantially equal to zero. The electric energy is transmitted from the input power supply 301 to the resonant network 320. In some other embodiments, the switches SS32 and SS34 are turned on during the time interval [T43-T44], such that the secondary winding LN3 is short-circuited.

In some embodiments, the first switch and the third switch forms a third switch group, and the second switch and the fourth switch forms a fourth switch group, and the control circuit 350 is configured to control one of the third switch group and the fourth switch group to be turned on during the time interval [T43-T44], such that the secondary winding LN3 is short-circuited. For example, the control circuit 350 is configured to control the switches SS32 and SS34 or the switches SS31 and SS33 to be turned on during the time interval [T43-T44], such that the secondary winding LN3 is short-circuited to increase the current ILR3 of the resonant network 320, and the current output IL3 is substantially equal zero, such that the gain of the resonant converter 300 is increased to increase the holdup time and maintain the output voltage in the specific voltage range.

In some embodiments, the first switch and the fourth switch forms a first switch group, and the second switch and the third switch forms a second switch group, and the control circuit 350 is configured to control the second switch group to be turned on and the first switch group to be turned off during the time interval [T43-T44], such that the secondary winding LN3 is clamped by a preset voltage. For example, the control circuit 350 is configured to control the switches SS32, SS33 to be turned on and the switches SS31, SS34 to be turned off, such that the current IL3 flows in a direction (a second flowing direction) from the node N38 passing through the secondary winding LN3 to the node N37. The secondary winding LN3 is clamped by a preset voltage. It increases the current ILR3 of the resonant network 320 in the first direction, such that the gain of the resonant converter 300 is increased.

As described above, due to the electric energy being transmitted from the input power supply 301 and/or the secondary circuit 340 to the resonant network 320, the current ILR3 is increased during the time interval [T43-T44], such that the holdup time of the resonant converter 300 is increased.

In some embodiments, the control circuit 350 is configured to control the switches SS31-SS34 to adjust the current ILR3. In the embodiments corresponding to FIG. 4, the control circuit 350 is configured to determine the moment T43 by turning on the switch SS33 and the switch SS31 during the time interval [T42-T44]. For example, the control circuit 350 is configured to turn on the switch SS33 and the switch SS31 earlier in the time interval [T42-T44], such that the moment T43 is moved forward in time and a length of the time interval [T43-T44] is increased correspondingly to increase the holdup time. As a result, the current ILR3 is increased for the longer time interval [T43-T44]. In some other embodiments, the control circuit 350 is configured to turn on the switch SS33 and the switch SS31 before the moment T42 to further increase the current ILR3. In which the time interval [T43-T44] is defined by a moment that the current IL3 is substantially equal to zero.

As described above, the control circuit 350 is configured to adjust the time interval [T43-T44] according to the output voltage VO3 in some embodiments. The control circuit 350 is configured to adjust the time interval [T43-T44] according to the output voltage VO3 and the input voltage VI3 in some other embodiments. Therefore, by controlling the switches SS31-SS34 during the time interval [T43-T44], the control circuit 350 is configured to increase the gain of the resonant converter 300.

For example, when the input power supply 301 fails, the control circuit 350 controls the switches SS31-SS34 as described above to increase the holdup time.

Figure 5A:
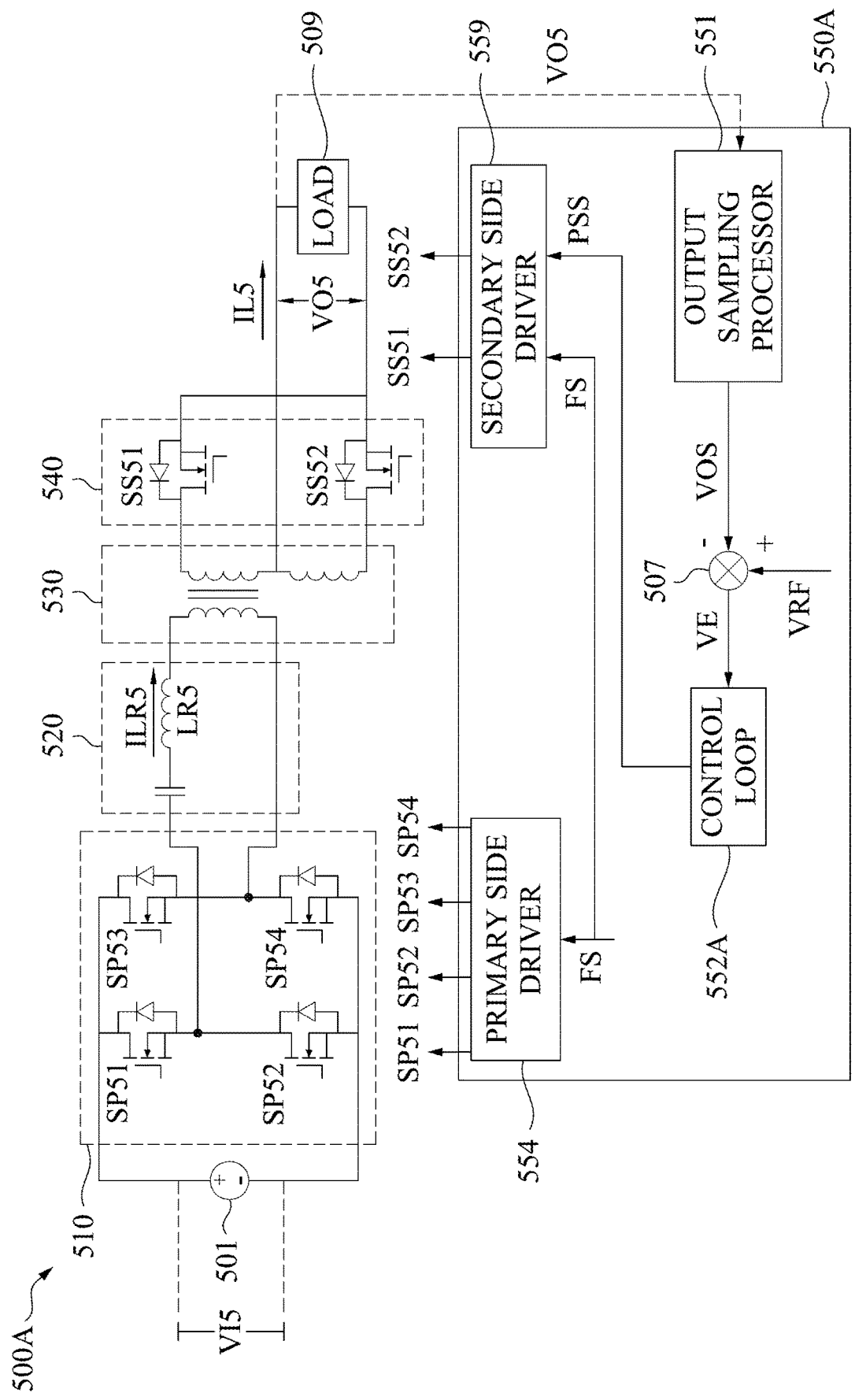
FIG. 5A-FIG. 5D are circuit diagrams of resonant converters with different configurations of control circuits in accordance with some embodiments of the present disclosure.

FIG. 5A is a circuit diagram of a resonant converter 500A in accordance with some embodiments of the present disclosure. As illustratively shown in FIG. 5A, the resonant converter 500A is coupled to an input power supply 501 to receive an input voltage VI5. The resonant converter 500A is configured to receive the input voltage VI5 and provide an output voltage VO5 to a load 509. The resonant converter 500A includes a primary circuit 510, a resonant network 520, a transformer 530, a secondary circuit 540 and a control circuit 550A. The configurations and operations of components of resonant converter 500A are similar to those of the resonant converter 100 in FIG. 1 and the resonant converter 300 in FIG. 3. Therefore, some descriptions are not repeated in embodiments associated with FIG. 5A for brevity.

As illustratively shown in FIG. 5A, the primary circuit 510 is implemented by a full bridge circuit including switches SP51-S54. The configurations and operations of the primary circuit 510 are similar to those of the primary circuit 310 in FIG. 3. Therefore, some descriptions are not repeated for brevity. In some embodiments, the switches SP51-SP54 are configured to operate with a switching frequency FS determined by the control circuit 550A. In some other embodiments, the primary circuit 510 is implemented by a half bridge circuit as the primary circuit 110 illustratively shown in FIG. 1.

As illustratively shown in FIG. 5A, the resonant network 520 includes a capacitor and an inductor LR5. In operation, a current ILR5 passes through the inductor LR5 when the resonant converter 500A operates.

As illustratively shown in FIG. 5A with reference to FIG. 1, the configuration and operation of the transformer 530 are similar to those of the transformer 130 in FIG. 1. Therefore, some descriptions are not repeated for brevity.

As illustratively shown in FIG. 5A, the secondary circuit 540 is implemented by a half bridge circuit including switches SS51 and SS52. A first terminal of the first switch SS51 is coupled to a first terminal of the secondary winding, a second terminal of the first switch SS51 is coupled to a second terminal of the second switch SS52, a first terminal of the second switch SS52 is coupled to a second terminal of the secondary winding, a second terminal of the first switch SS51 is coupled to a second output terminal of the resonant converter 500A, and a center-tapped terminal of the secondary winding is coupled to a first output terminal of the resonant converter 500A. In some embodiments, an output current IL5 flows in a direction from the first output terminal to the second output terminal through the load 509. The configuration and operation of the secondary circuit 540 are similar to that of the secondary circuit 140 in FIG. 1. Therefore, some descriptions are not repeated for brevity. In some other embodiments, the secondary circuit 540 is implemented by a full bridge circuit as the secondary circuit 340 illustratively shown in FIG. 3.

As illustratively shown in FIG. 5A, the control circuit 550A includes an output sampling processor 551, a comparator 507, a control loop 552A, a primary side driver 554 and a secondary side driver 559.

In some embodiments, the output sampling processor 551 is configured to receive an output voltage VO5 and provide a scaled output voltage VOS according to the output voltage VO5. The output sampling processor 551 calculates and generates the scaled output voltage VOS according to the output voltage VO5, in which the scaled output voltage VOS and the output voltage VO5 are a certain proportional relation.

In some embodiments, the comparator 507 is configured to receive the scaled output voltage VOS, compare the scaled output voltage VOS with a reference voltage VRF and provide an error signal VE. The error signal VE corresponds to the difference between the reference voltage VRF and the scaled output voltage VOS. In some embodiments, the output voltage VO5 can be replaced by an output current or an output power, and the reference voltage VRF can be replaced by a reference current, or a reference power. When the output voltage VO5 is replaced by the output current, the reference voltage VRF is replaced by the reference current, or when the output voltage VO5 is replaced by the output power, the reference voltage VRF is replaced by the reference power.

In some embodiments, the control loop 552A is configured to receive the error signal VE and provide a phase-shifting angle PSS.

In some embodiments, the primary side driver 554 is configured to receive the switching frequency FS to control operations of the switches SP51-SP54 according to the switching frequency FS. The primary side driver 554 is configured to receive the switching frequency FS from a component within the control circuit 550A or a component outside of the control circuit 550A. The primary side driver 554 generates a plurality of primary driving signals according to the switching frequency FS to drive the corresponding primary switch operating with the switching frequency FS. In some embodiments, the primary driving signals are complementary with each other. In some embodiments, the switching frequency FS is substantially equal to a preset frequency.

In some embodiments, the secondary side driver 559 is configured to receive the switching frequency FS and the phase-shifting angle PSS to drive the switches SS51 and SS52, such that the first switch SS51 is turned on during the first time interval (e.g. [T23-T24] and [T43-T44] described above). The secondary side driver 559 generates a plurality of secondary driving signals according to the switching frequency FS and the phase-shifting angle PSS to drive the corresponding secondary switch. In some embodiments, the phase-shifting angle PSS is adjusted according to the output voltage VO5, such that the first time interval (e.g. [T23-T24] and [T43-T44] described above) is adjusted by the second side driver 559 according to the output voltage VO5 and the switching frequency FS. In some embodiments, the second time interval (e.g. [T22-T23] and [T42-T43] described above) is adjusted by the second side driver 559 according to the output voltage VO5 and the switching frequency FS.

In some embodiments, when the input power supply goes down and the scaled output voltage VOS is lower than the reference voltage VRF, the control loop 552A is configured to adjust the phase-shifting angle PSS, such that the phase-shifting angle PSS is increased. The phase-shifting angle PSS is increased to increase the scaled output voltage VOS, such that the scaled output voltage VOS is stabilized at the reference voltage VRF. In some embodiments, when the input power supply goes up and the scaled output voltage VOS is higher than the reference voltage VRF, the control loop 552A is configured to adjust the phase-shifting angle PSS, such that the phase-shifting angle PSS is decreased. The phase-shifting angle PSS is decreased to decrease the scaled output voltage VOS, such that the scaled output voltage VOS is stabilized at the reference voltage VRF. The secondary side driver 559 drives the switch SS51 to be turned on and the switch SS52 to be turned off during the first time interval (e.g. [T23-T24] and [T43-T44] described above) to increase the gain of the resonant converter 500A. In some embodiments, the preset frequency is determined by the features of the resonant converter 500A. In some embodiments, the first time interval is adjusted by the second side driver 559 according to the output voltage VO5 and the switching frequency FS.

In some embodiments, the control loop 552A is configured to adjust the phase-shifting angle PSS to move the beginning moment of the first time interval (e.g. [T23-T24] and [T43-T44] described above) forward in time to further increase the gain according to the switching frequency FS and the phase-shifting angle PSS. The output voltage VO5 increasing is referred to as a gain of the resonant converter 500A increasing in some embodiments.

Figure 5B:
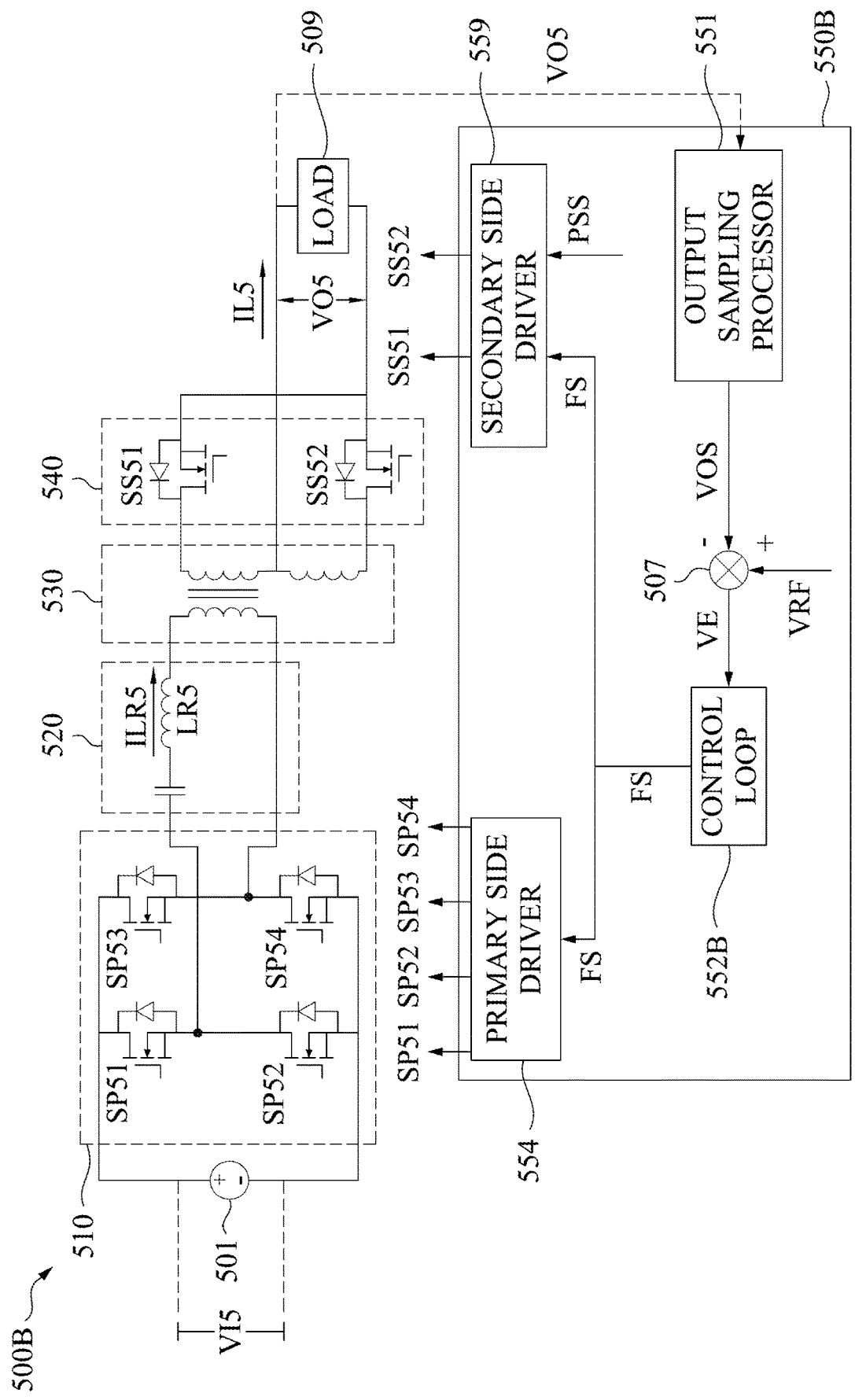

FIG. 5B is a circuit diagram of a resonant converter 500B in accordance with some embodiments of the present disclosure. As illustratively shown in FIG. 5B with reference to FIG. 5A, configurations of the resonant converter 500B are similar to those of resonant converter 500A. Therefore, some descriptions are not repeated in embodiments associated with FIG. 5B for brevity.

As illustratively shown in FIG. 5B with reference to FIG. 5A, differences between the resonant converter 500B and 500A focus in the control circuit 550B. The differences between the resonant converter 500B and 500A includes that the control circuit 550B includes a control loop 552B.

In some embodiments, the control loop 552B is configured to receive an error signal VE and provide the switching frequency FS.

In some embodiments, the switching frequency FS is adjusted according to the output voltage VO5, such that the first time interval (e.g. [T23-T24] and [T43-T44] described above) is adjusted by the second side driver 559 according to the output voltage VO5 and the phase-shifting angle PSS. In some embodiments, the second time interval (e.g. [T22-T23] and [T42-T43] described above) is adjusted by the second side driver 559 according to the output voltage VO5 and the phase-shifting angle PSS. In some embodiments, the phase-shifting angle PSS is a fixed value.

In some embodiments, when the phase-shifting angle PSS is fixed, the control loop 552B is configured to decrease the switching frequency FS to increase the output voltage VO5. The output voltage VO5 increasing is referred to as a gain of the resonant converter 500B increasing in some embodiments.

In some embodiments, when the input power supply goes down and the scaled output voltage VOS is lower than the reference voltage VRF, the control loop 552B is configured to adjust the switching frequency FS, such that the switching frequency FS is decreased. The switching frequency FS is decreased to increase the scaled output voltage VOS, such that the scaled output voltage VOS is stabilized at the reference voltage VRF. In some embodiments, when the input power supply goes up and the scaled output voltage VOS is higher than the reference voltage VRF, the control loop 552B is configured to adjust the switching frequency FS, such that the switching frequency FS is increased. The switching frequency FS is increased to decrease the scaled output voltage VOS, such that the scaled output voltage VOS is stabilized at the reference voltage VRF.

Figure 5C:
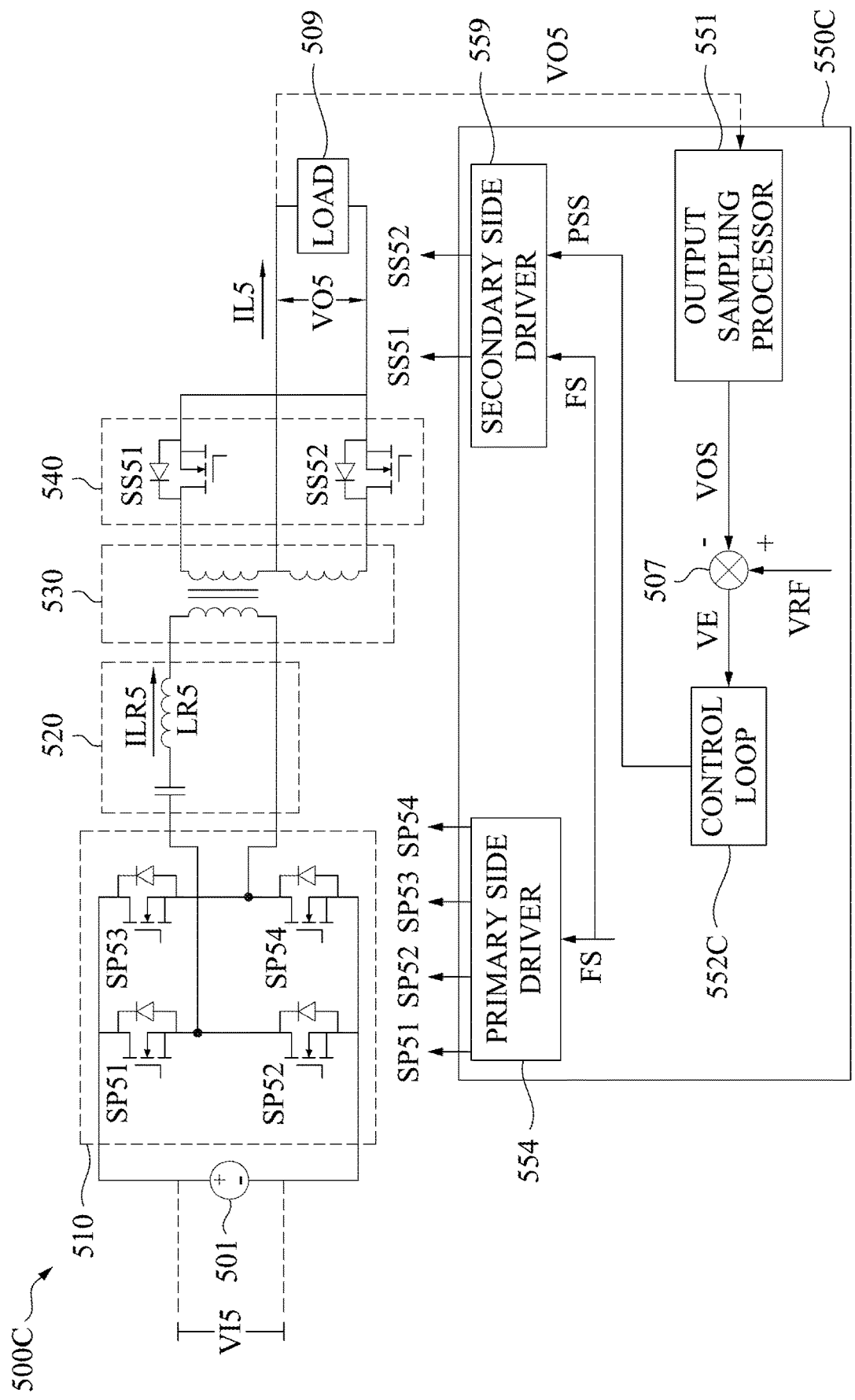

FIG. 5C is a circuit diagram of a resonant converter 500C in accordance with some embodiments of the present disclosure. As illustratively shown in FIG. 5C with reference to FIG. 5B, configurations of the resonant converter 500C are similar to those of resonant converter 500B. Therefore, some descriptions are not repeated in embodiments associated with FIG. 5C for brevity.

As illustratively shown in FIG. 5C with reference to FIG. 5B, differences between the resonant converter 500C and 500B focus in the control circuit 550C. The control circuit 550C includes a control loop 552C. The operation of the control loop 552C is similar to that of the control loop 552B, and thus some descriptions are not repeated for brevity.

In some embodiments, the control loop 552C is configured to receive an error signal VE and provide the switching frequency FS and the phase-shifting angle PSS. In some embodiments, the control loop 552C is configured to generate the switching frequency FS and the phase-shifting angle PSS according to the error signal VE, such that the scaled output voltage VOS is stabilized at the reference voltage VRF. In various embodiments, the control loop 552C can be implemented by analog controlling or digital controlling. In some embodiments, the phase-shifting angle PSS is a function of the switching frequency FS. For example, the phase-shifting angle PSS may be $k \times (1/FS - 1/FR)$, in which FR is a preset switching frequency.

In some embodiments, when the switching frequency FS is greater than a preset switching frequency FR, the control circuit 550C is configured to stop providing a phase-shifting angle PSS and control the plurality of secondary switches SS51 and SS52 operating in a normal state. When the switching frequency FS is lesser than or equal to the preset switching frequency FR, the control circuit 550C is configured to provide the phase-shifting angle PSS and control at least one of the plurality of secondary switches SS51 and SS52 to be turned on during a first time interval, such that the secondary winding being clamped by a preset voltage, a current of the resonant network is increased in a first flowing direction, and an output current is increased in a second flowing direction or equal to zero.

In some embodiments, when the plurality of secondary switches operates in an abnormal state, the input power supply goes down and the scaled output voltage VOS is lower than the reference voltage VRF, the control loop 552C is configured to adjust the switching frequency FS and the phase-shifting angle PSS, such that the switching frequency FS is decreased and the phase-shifting angle PSS is increased simultaneously. The switching frequency FS is decreased and the phase-shifting angle PSS is increased to increase the scaled output voltage VOS, such that the scaled output voltage VOS is stabilized at the reference voltage VRF.

In some embodiments, when the input power supply goes up and the scaled output voltage VOS is higher than the reference voltage VRF, the control loop 552C is configured to adjust the switching frequency FS and the phase-shifting angle PSS, such that the switching frequency FS is increased and the phase-shifting angle PSS is decreased. The switching frequency FS is increased and the phase-shifting angle PSS is decreased to decrease the scaled output voltage VOS, such that the scaled output voltage VOS is stabilized at the reference voltage VRF.

In some embodiments, when the switching frequency FS is larger than a minimum frequency, the phase-shifting angle PSS is equal to zero, and the control loop 552C is configured to adjust the switching frequency FS. In some embodiments, when the switching frequency FS is smaller than or equal to the minimum frequency, the switching frequency FS is adjusted to the minimum frequency, and the control loop 552C is configured to adjust the phase-shifting angle PSS. The details are described following.

In some embodiments, when the scaled output voltage VOS is lower than the reference voltage VRF and the switching frequency FS is bigger than the minimum frequency, the control loop 552C is configured to adjust the switching frequency FS, such that the switching frequency FS is decreased. The switching frequency FS is decreased to increase the scaled output voltage VOS, such that the scaled output voltage VOS is stabilized at the reference voltage VRF. When the switching frequency FS is decreased to the minimum frequency, the switching frequency FS is equal to the minimum frequency. At this moment, the control loop 552C is configured to adjust the phase-shifting angle PSS, such that the phase-shifting angle PSS is increased to increase the scaled output voltage VOS and the scaled output voltage VOS is stabilized at the reference voltage VRF.

In some embodiments, when the scaled output voltage VOS is higher than the reference voltage VRF and the switching frequency FS is equal to the minimum frequency, the control loop 552C is configured to adjust the phase-shifting angle PSS, such that the phase-shifting angle PSS is decreased. The phase-shifting angle PSS is decreased to decrease the scaled output voltage VOS, such that the scaled output voltage VOS is stabilized at the reference voltage VRF. When the phase-shifting angle PSS is decreased to a minimum phase-shifting angle or being equal to zero, the phase-shifting angle PSS is equal to minimum phase-shifting angle or equal to zero. At this moment, the control loop 552C is configured to adjust the switching frequency FS, such that the switching frequency FS is increased to decrease the scaled output voltage VOS and the scaled output voltage VOS is stabilized at the reference voltage VRF. In some embodiments, the switching frequency FS and the phase-shifting angle PSS is adjusted according to the output voltage VO5, such that the first time interval and/or the second time interval is adjusted by the second side driver 559 according to the output voltage VO5. The output voltage VO5 as well as a gain of the resonant converter 500C is increased when the first time interval is increased. In some embodiments, the first time interval is adjusted by the second side driver 559 according to the output voltage VO5.

Figure 5D:
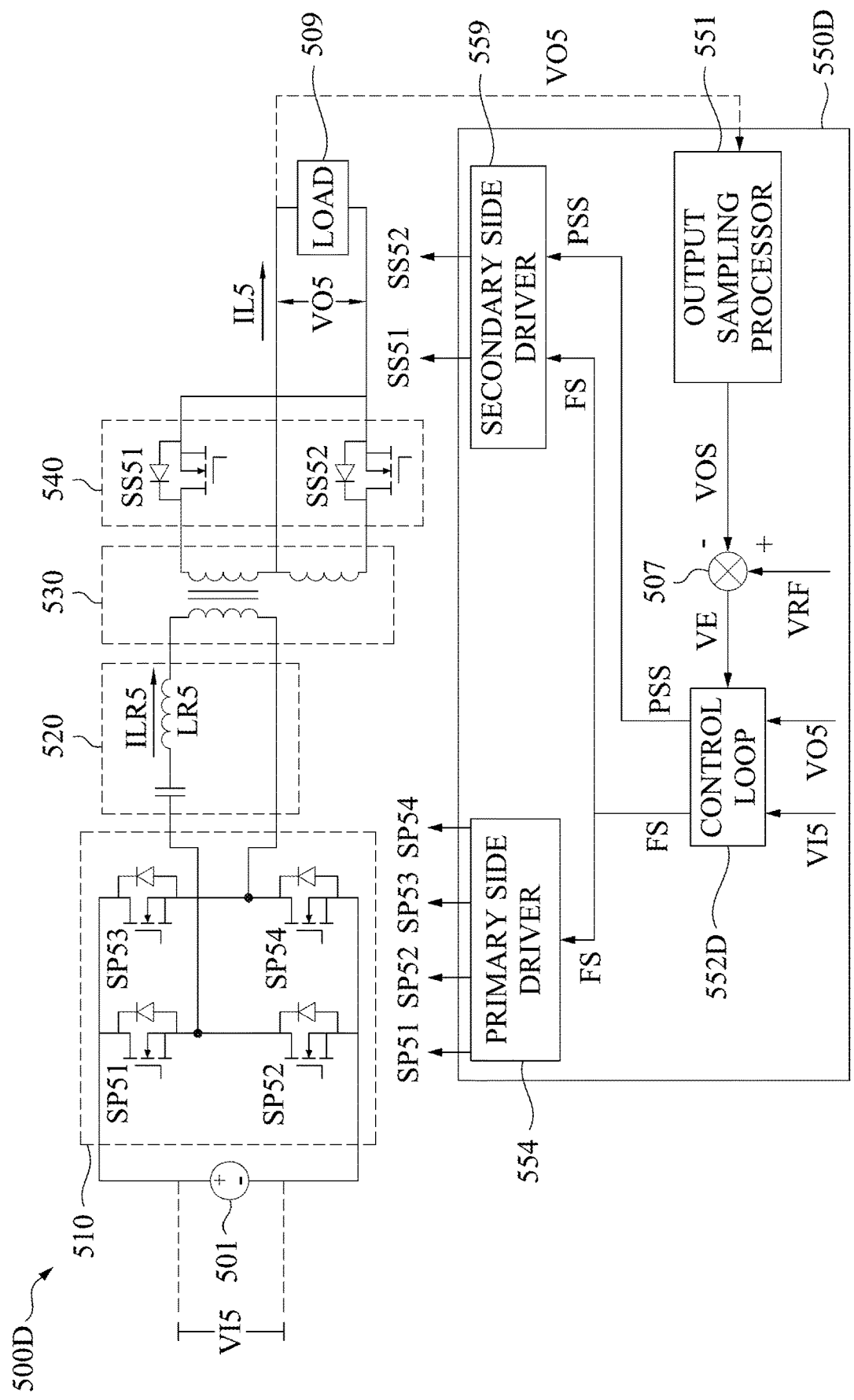

FIG. 5D is a circuit diagram of a resonant converter 500D in accordance with some embodiments of the present disclosure. As illustratively shown in FIG. 5D with reference to FIG. 5C, configurations of the resonant converter 500D are similar to those of resonant converter 500C. Therefore, some descriptions are not repeated in embodiments associated with FIG. 5D for brevity.

As illustratively shown in FIG. 5D with reference to FIG. 5C, differences between the resonant converter 500D and 500C focus in the control circuit 550D. The control circuit 550D includes a control loop 552D. The operation of the control loop 552D is similar to that of the control loop 552C, and thus some descriptions are not repeated for brevity.

In some embodiments, the control loop 552D is configured to receive the error signal VE and the input voltage VI5 and provide the switching frequency FS and the phase-shifting angle PSS.

In some embodiments, the control loop 552D is configured to generate the switching frequency FS and the phase-shifting angle PSS, such that the scaled output voltage VOS is stabilized at the reference voltage VRF. In various embodiments, the control loop 552D can be implemented by analog controlling or digital controlling.

In some embodiments, the switching frequency FS and the phase-shifting angle PSS is adjusted according to the output voltage VO5 and the input voltage VI5, such that the first time interval and/or the second time interval is adjusted by the second side driver 559 according to the output voltage VO5 and the input voltage VI5. The output voltage as well as a gain of the resonant converter 500D is increased when a first time interval is increased. In some embodiments, the first time interval is adjusted by the second side driver 559 according to the output voltage VO5 and the input voltage VI5.

Figure 6:
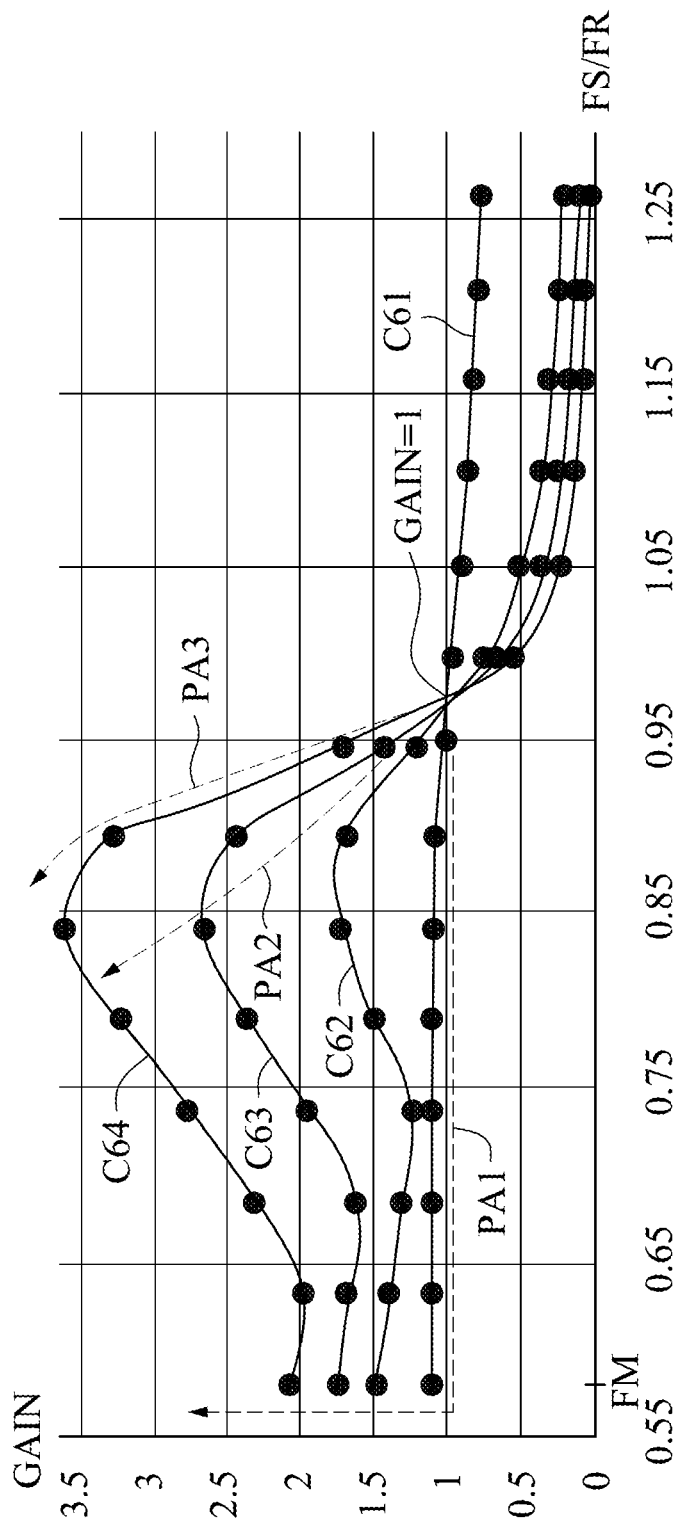
FIG. 6 is a diagram illustrating relationships between gains of different switching frequencies and different phase-shifting angles of a resonant converter in accordance with some embodiments of the present disclosure.

FIG. 6 is a diagram 600 illustrating relationships between gains of different switching frequencies and different phase-shifting angles of a resonant converter in accordance with some embodiments of the present disclosure. As illustratively shown in FIG. 6, the diagram 600 includes a horizontal axis corresponding to ratios of switching frequencies FS of the resonant converter to a resonant frequency FR of a resonant network in the resonant converter, and a vertical axis corresponding to gains of the resonant converter.

Furthermore, the diagram 600 includes curves C61-C64. As the curves C61-C64 shown, when the phase-shifting angle is a constant (corresponding to each of the curves C61-C64), the gain is increased as the switching frequency FS is decreased. When the switching frequency FS is a constant, the gain is increased as the phase-shifting angle is increased. The gain is increased as the phase-shifting angle is increased (i.e., from curve C61 to curves C62-C64 in order) and the switching frequency is decreased.

During the first time interval (e.g. [T23-T24] and [T43-T44] described above), control circuit is configured to adjust the switching frequency FS and/or the phase-shifting angle PSS to increase the gain of the resonant converter.

As illustratively shown in FIG. 6 with reference to FIG. 5A. The switching frequency FS is substantially equal to the preset frequency. The control circuit 550A is configured to adjust the phase-shifting signal according to the output voltage VO5 to increase the gain of the resonant converter 500A.

As illustratively shown in FIG. 6 with reference to FIG. 5B. The phase-shifting angle is a fixed vale. The control circuit 550B is configured to adjust the switching frequency according to the output voltage VO5 to increase the gain of the resonant converter 500B.

As illustratively shown in FIG. 6 with reference to FIG. 5C, The control circuit 550C is configured to adjust the phase-shifting signal PSS and the switching frequency FS according to the output voltage VO5 to increase the gain of the resonant converter 500C.

As illustratively shown in FIG. 6 with reference to FIG. 5D, The control circuit 550D is configured to adjust the phase-shifting signal PSS and the switching frequency FS according to the output voltage VO5 and the input voltage VI5 to increase the gain of the resonant converter 500D.

In some approaches, an output voltage of a resonant converter decreases when an input voltage decreases, e.g., an input power supply of the resonant converter fails. Compare to above approaches, in some embodiments of present disclosure, various methods are provided for maintaining the output voltage by adjusting the first time interval (e.g. [T23-T24] and [T43-T44] described above).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A resonant converter, comprising:
   a primary circuit coupled to an input power supply, and the primary circuit comprising a plurality of primary switches;
   a transformer having a primary winding and a secondary winding;
   a resonant network coupled between the primary circuit and the primary winding;
   a secondary circuit coupled to the secondary winding, and the secondary circuit comprising a plurality of secondary switches; and
   a control circuit coupled to the primary circuit and the secondary circuit, and configured to control the plurality of primary switches operating with a switching frequency,
   wherein at least one of the plurality of primary switches is configured to be turned on from a first switching moment until a second switching moment; and
   the control circuit is configured to control at least one of the plurality of secondary switches to be turned on during a first time interval, such that the secondary winding is clamped by a preset voltage, a current of the resonant network is increased in a first flowing direction, and an output current is increased in a second flowing direction or equal to zero, wherein the first time interval is between the first switching moment and the second switching moment,
   wherein the first time interval is determined by a third switching moment and the second switching moment,
   the at least one of the plurality of primary switches is turned on from the third switching moment until the second switching moment and is turned off at the second switching moment, and
   the at least one of the plurality of secondary switches is turned on from the third switching moment until the second switching moment.

2. The resonant converter of claim 1, wherein the control circuit is further configured to adjust the first time interval according to an input voltage, or adjust the first time interval according to an output voltage and an input voltage.

3. The resonant converter of claim 1, wherein the control circuit is further configured to control at least two of the plurality of secondary switches to be turned off during a second time interval, wherein the second time interval is between the first switching moment and the first time interval.

4. The resonant converter of claim 3, wherein the control circuit is further configured to adjust the second time interval according to an output voltage, or configured to adjust the second time interval according to the output voltage and an input voltage.

5. The resonant converter of claim 1, wherein the secondary winding comprises: a first terminal, a second terminal and a center-tapped terminal; and
   the plurality of secondary switches comprises: a first switch and a second switch;
      wherein a first terminal of the first switch is coupled to the first terminal of the secondary winding;
      a first terminal of the second switch is coupled to the second terminal of the secondary winding, a second terminal of the second switch is coupled to the second terminal of the first switch;
      wherein the second terminal of the first switch is coupled to a first output terminal of the resonant converter and the center-tapped terminal is coupled to a second output terminal of the resonant converter, and the control circuit is configured to control the second switch to be turned on during the first time interval, such that the secondary winding is clamped by the preset voltage, the current of the resonant network is increased in the first flowing direction and the output current is increased in the second flowing direction; or
      the second terminal of the first switch is coupled to the second output terminal of the resonant converter and the center-tapped terminal is coupled to the first output terminal of the resonant converter, and the control circuit is configured to control the first switch to be turned on during the first time interval, such that the secondary winding is clamped by the preset voltage, the current of the resonant network is increased in the first flowing direction and the output current is increased in the second flowing direction.

6. The resonant converter of claim 5, wherein the control circuit is further configured to control the first switch and the second switch to be turned off during a second time interval, wherein the second time interval is between the first switching moment and the first time interval.

7. The resonant converter of claim 1, wherein the plurality of secondary switches comprises: a first switch, a second switch, a third switch and a fourth switch;
   a first terminal of the first switch is coupled to a first terminal of the secondary winding, a second terminal of the first switch is coupled to a first output terminal of the resonant converter;
   a first terminal of the second switch is coupled to the first terminal of the secondary winding, a second terminal of the second switch is coupled to a second output terminal of the resonant converter;
   a first terminal of the third switch is coupled to the second terminal of the first switch, a second terminal of the third switch is coupled to a second terminal of the secondary winding; and
   a first terminal of the fourth switch is coupled to the second terminal of the third switch, a second terminal of the fourth switch is coupled to the second terminal of the second switch.

8. The resonant converter of claim 7, wherein the first switch and the fourth switch form a first switch group, and the second switch and the third switch form a second switch group; and
   the control circuit is configured to control the second switch group to be turned on during the first time interval, such that the secondary winding is clamped by the preset voltage, the current of the resonant network is increased in the first flowing direction and the output current is increased in the second flowing direction.

9. The resonant converter of claim 7, wherein the first switch and the third switch form a third switch group, and the second switch and the fourth switch form a fourth switch group; and
   the control circuit is configured to control one of the third switch group and the fourth switch group to be turned on during the first time interval, such that the secondary winding is clamped by the preset voltage, the current of the resonant network is increased in the first flowing direction and the output current is equal to zero, wherein the preset voltage is equal to zero.

10. The resonant converter of claim 7, wherein the control circuit is further configured to control at least three of the first switch, the second switch, the third switch or the fourth switch to be turned off during a second time interval, wherein the second time interval is between the first switching moment and the first time interval.

11. The resonant converter of claim 1, wherein the control circuit comprises:
   a primary side driver configured to receive the switching frequency and control the plurality of primary switches operating according to the switching frequency;
   an output sampling processor configured to receive an output voltage and provide a scaled output voltage;
   a comparator configured to receive the scaled output voltage and a reference voltage and provide an error signal;
   a control loop configured to receive the error signal and provide a phase-shifting angle; and
   a secondary side driver configured to receive the switching frequency and the phase-shifting angle and control at least one of the plurality of secondary switches to be turned on during the first time interval according to the switching frequency and the phase-shifting angle.

12. The resonant converter of claim 11, wherein the switching frequency is substantially equal to a preset frequency.

13. The resonant converter of claim 11, wherein the first time interval is adjusted by the second side driver according to the output voltage and the switching frequency.

14. The resonant converter of claim 1, wherein the control circuit comprising:
   an output sampling processor configured to receive an output voltage and provide a scaled output voltage;
   a comparator configured to receive the scaled output voltage and a reference voltage and provide an error signal;
   a control loop configured to receive the error signal and provide the switching frequency;
   a primary side driver configured to receive the switching frequency and control the plurality of primary switches operating according to the switching frequency; and
   a secondary side driver configured to receive the switching frequency and a phase-shifting angle and control at least one of secondary switches to be turned on during the first time interval according to the switching frequency and the phase-shifting angle.

15. The resonant converter of claim 14, wherein the phase-shifting angle is a fixed value.

16. The resonant converter of claim 14, wherein the first time interval is adjusted by the secondary side driver according to the output voltage and the phase-shifting angle.

17. The resonant converter of claim 1, wherein the control circuit comprising:
   an output sampling processor configured to receive an output voltage and provide a scaled output voltage;
   a comparator configured to receive the scaled output voltage and a reference voltage and provide an error signal;
   a control loop configured to receive the error signal and provide the switching frequency and a phase-shifting angle;
   a primary side driver configured to receive the switching frequency and control the plurality of primary switches operating according to the switching frequency; and
   a secondary side driver configured to receive the switching frequency and the phase-shifting angle and control at least one of the plurality of secondary switches to be turned on during the first time interval according to the switching frequency and the phase-shifting angle.

18. The resonant converter of claim 17, wherein the first time interval is adjusted by the second side driver according to the output voltage.

19. The resonant converter of claim 1, wherein the control circuit comprising:
   an output sampling processor configured to receive an output voltage and provide a scaled output voltage;
   a comparator configured to receive the scaled output voltage and a reference voltage and provide an error signal;
   a control loop configured to receive the error signal and an input voltage and provide the switching frequency and a phase-shifting angle;
   a primary side driver configured to receive the switching frequency and control the plurality of primary switches operating according to the switching frequency; and
   a secondary side driver configured to receive the switching frequency and the phase-shifting angle and control at least one of the plurality of secondary switches to be turned on during the first time interval according to the switching frequency and the phase-shifting angle.

20. The resonant converter of claim 19, wherein the first time interval is adjusted by the second side driver according to the output voltage and the input voltage.

21. A method of operating a resonant converter, the resonant converter including a primary circuit, a resonant network coupled to the primary circuit, a transformer having a primary winding coupled to the resonant network and a secondary winding, a secondary circuit coupled to the secondary winding, and a control circuit coupled to the primary circuit and the secondary circuit, wherein the primary circuit includes a plurality of primary switches, and the secondary circuit includes a plurality of secondary switches, the method comprising:
   controlling the plurality of primary switches operating with a switching frequency, wherein at least one of the plurality of primary switches is configured to be turned on from a first switching moment until a second switching moment; and
   controlling at least one of the plurality of secondary switches to be turned on during a first time interval, such that the secondary winding being clamped by a preset voltage, a current of the resonant network is increased in a first flowing direction, and an output current is increased in a second flowing direction or equal to zero, wherein the first time interval is between the first switching moment and the second switching moment,
   wherein the first time interval is determined by a third switching moment and the second switching moment,
   the at least one of the plurality of primary switches is turned on from the third switching moment until the second switching moment and is turned off at the second switching moment, and
   the at least one of the plurality of secondary switches is turned on from the third switching moment until the second switching moment.

22. The method of claim 21, further comprising:
   adjusting the first time interval according to an output voltage; or
   adjusting the first time interval according to the output voltage and an input voltage.

23. The method of claim 21, further comprising:
   controlling at least two of the plurality of secondary switches to be turned off during a second time interval, wherein the second time interval is between the first switching moment and the first time interval.

24. The method of claim 21, wherein controlling the plurality of primary switches operating with the switching frequency, further comprising:
receiving the switching frequency; and
controlling the plurality of primary switches operating according to the switching frequency; and
controlling at least one of the plurality of secondary switches to be turned on during the first time interval, further comprising:
receiving an output voltage and providing a scaled output voltage according to the output voltage;
providing an error signal according to the scaled output voltage and a reference voltage;
providing a phase-shifting angle according to the error signal; and
controlling at least one of the plurality of secondary switches to be turned on during the first time interval according to the switching frequency and the phase-shifting angle.

25. The method of claim 21, wherein controlling the plurality of primary switches operating with the switching frequency, further comprising:
receiving an output voltage and providing a scaled output voltage according to the output voltage;
providing an error signal according to the scaled output voltage and a reference voltage;
providing the switching frequency according to the error signal; and
controlling the plurality of primary switches operating according to the switching frequency; and
controlling at least one of the plurality of secondary switches to be turned on during the first time interval, further comprising:
receiving a phase-shifting angle and the switching frequency; and
controlling at least one of the plurality of secondary switches to be turned on during the first time interval according to the switching frequency and the phase-shifting angle.

26. The method of claim 21, wherein controlling the plurality of primary switches operating with the switching frequency, further comprising:
receiving an output voltage and providing a scaled output voltage according to the output voltage;
providing an error signal according to the scaled output voltage and a reference voltage;
providing the switching frequency and a phase-shifting angle according to the error signal; and
controlling the plurality of primary switches operating according to the switching frequency; and
controlling at least one of the plurality of secondary switches to be turned on during the first time interval, further comprising:
controlling at least one of the plurality of secondary switches to be turned on during the first time interval according to the switching frequency and the phase-shifting angle.

27. The method of claim 21, wherein controlling the plurality of primary switches operating with the switching frequency, further comprising:
receiving an output power and providing a scaled output voltage according to an output voltage;
providing an error signal according to the scaled output voltage and a reference voltage;
providing the switching frequency and a phase-shifting angle according to the error signal and an input voltage; and
controlling the plurality of primary switches according to the switching frequency; and
controlling at least one of the plurality of secondary switches to be turned on during the first time interval, further comprising:
controlling at least one of the plurality of secondary switches to be turned on during the first time interval according to the switching frequency and the phase-shifting angle.

28. A resonant converter, comprising:
a primary circuit coupled to an input power supply, and the primary circuit comprising a plurality of primary switches;
a transformer having a primary winding and a secondary winding;
a resonant network coupled between the primary circuit and the primary winding;
a secondary circuit coupled to the secondary winding, and the secondary circuit comprising a plurality of secondary switches; and
a control circuit coupled to the primary circuit and the secondary circuit, and configured to control the plurality of primary switches operating with a switching frequency, wherein at least one of the plurality of primary switches is configured to be turned on from a first switching moment until a second switching moment,
wherein when the switching frequency is greater than a preset switching frequency, the control circuit is configured to control the plurality of secondary switches operating in a normal state, and
when the switching frequency is lesser than or equal to the preset switching frequency, the control circuit is configured to control at least one of the plurality of secondary switches to be turned on during a first time interval, such that the secondary winding being clamped by a preset voltage, a current of the resonant network is increased in a first flowing direction, and an output current is increased in a second flowing direction or equal to zero, wherein the first time interval is between the first switching moment and the second switching moment,
wherein the first time interval is determined by a third switching moment and the second switching moment,
the at least one of the plurality of primary switches is turned on from the third switching moment until the second switching moment and is turned off at the second switching moment, and
the at least one of the plurality of secondary switches is turned on from the third switching moment until the second switching moment.

29. The resonant converter of claim 28, wherein the control circuit is further configured to adjust the first time interval according to an output voltage, or the control circuit is further configured to adjust the first time interval according to the output voltage and an input voltage.

30. The resonant converter of claim 28, wherein the control circuit is further configured to control at least two of the plurality of secondary switches to be turned off during a second time interval, wherein the second time interval is between the first switching moment and the first time interval.

31. The resonant converter of claim 28, wherein the control circuit comprises:
an output sampling processor configured to receive an output voltage and provide a scaled output voltage;

a comparator configured to receive the scaled output voltage and a reference voltage and provide an error signal; and a control loop configured to provide the switching frequency according to the error signal and compare the switching frequency with a preset switching frequency, wherein when the switching frequency is greater than a preset switching frequency, the control circuit is configured to stop providing a phase-shifting angle and control the plurality of secondary switches operating in a normal state, and when the switching frequency is lesser than or equal to the preset switching frequency, the control circuit is configured to provide the phase-shifting angle and control at least one of the plurality of secondary switches to be turned on during a first time interval.

* * * * *